May 6, 1969 C. S. COCKERELL 3,442,348

VEHICLES FOR TRAVELLING OVER LAND AND/OR WATER HAVING RECIRCULATING FLUID CURTAINS

Filed Nov. 27, 1963

INVENTOR
C. S. COCKERELL
BY *Cameron, Kerkam & Sutton*
ATTORNEYS

INVENTOR
C. S. COCKERELL
BY
Cameron, Kerkam & Sutton
ATTORNEYS

INVENTOR
C. S. COCKERELL
BY
Cameron, Kerkam & Sutton
ATTORNEYS

INVENTOR
C. S. COCKERELL
BY
Cameron, Kerkam & Sutton
ATTORNEYS

INVENTOR
C. S. COCKERELL
BY
Cameron, Kerkam & Sutton
ATTORNEYS

INVENTOR
C. S. COCKERELL
BY
Cameron, Kerkam & Sutton
ATTORNEYS

INVENTOR
C. S. COCKERELL
BY
Cameron, Kerkam + Sutton
ATTORNEYS

INVENTOR
C. S. COCKERELL
BY
Cameron, Kerkam & Sutton
ATTORNEYS

INVENTOR
C. S. COCKERELL
BY
Cameron, Kerkam & Sutton
ATTORNEYS

United States Patent Office 3,442,348

Patented May 6, 1969

3,442,348

VEHICLES FOR TRAVELLING OVER LAND AND/OR WATER HAVING RECIRCULATING FLUID CURTAINS

Christopher Sydney Cockerell, Bassett, Southampton, England, assignor to Hovercraft Development Limited, London, England, a British company Continuation-in-part of applications Ser. No. 809,699, Apr. 29, 1959, and Ser. No. 837,428, Sept. 1, 1959. This application Nov. 27, 1963, Ser. No. 326,497

Claims priority, application Great Britain, Sept. 1, 1958, 27,976/58, 27,977/58

Int. Cl. B60v *1/16*

U.S. Cl. 180—130 38 Claims

ABSTRACT OF THE DISCLOSURE

In a gas cushion vehicle in which the cushion is contained at least in part by a fluid curtain, means are provided to recover at least part of the fluid forming the curtain for reuse, either for forming a further curtain or for re-circulation in the original curtain. The fluid may be recovered by ports positioned either inboard or outboard of the port from which the initial fluid curtain issues. Recovered fluid may be re-energised before reuse and/or augmented by the supply of additional fluid. The re-energisation and augmentation may be effected by injectors. Multiple curtains may be formed, including curtains in the form of vortices.

Figure 1:
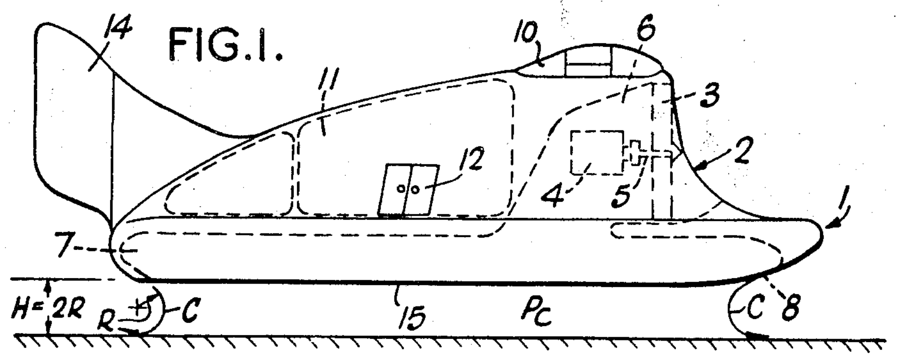

This is a continuation-in-part of applications Serial Nos. 809,699 and 837,428, filed April 29, 1959, and September 1, 1959, respectively, both now abandoned, and relates to vehicles for travelling or hovering over land and/or water of the kind described in co-pending application Serial No. 627,925 filed December 12, 1956 and since issued as Patent No. 3,363,716.

In such vehicles means are arranged to discharge at least one jet of fluid in the form of a curtain which acts as an envelope effectively enclosing with the structure of the vehicle a space between the underside of the vehicle and a surface over which the vehicle is to hover or travel and thereby forming an air cushion beneath the vehicle, the discharging means being so arranged that the total thrust produced by the jet of fluid as it finally leaves the vehicle is substantially less than the total weight of the vehicle, and the arrangement being such that, when the discharging means is in operation forming the curtain of fluid and the fluid is air, the air pressure within said space can be built up to the extent that is necessary to support or assist in supporting the vehicle out of contact with the surface. Where the fluid is not air, but it, for instance, water, the vehicle is provided with means for pumping air into the space beneath the vehicle to build up the pressure in such space to the required value. In either case, the curtain of fluid acts after the manner of the walls of a pneumatic tire and serves to contain the necessary pressure for supporting the vehicle.

Since the total thrust of the jet of fluid forming the curtain is less than the weight of the vehicle, the vehicle of the present invention is distinct from vertical take-off craft in which the total downward thrust of the jets employed must be at least equal to the total weight that they support. The vehicle is also distinctive in that it is not able to be supported at great and indefinite heights above the ground or other surface, but can only be raised to a predetermined height which is small in relation to the size of the vehicle and depends upon inter-relationships between the weight of the vehicle, the plan area enclosed by the curtain and the power of the means for discharging the fluid, i.e., the thrust of the curtain-forming jet.

The term "vehicle" as used herein is to be understood as including a platform or the like which, while capable of moving from place to place when supported above land or water as described above, is normally intended to remain stationary, for example, for supporting a radar installation.

The fluid discharged from the vehicle is deflected by the pressure of the cushion, the deflection, or change in momentum of the fluid, being related to the pressure of the cushion. Although the fluid is deflected, it still has considerable kinetic energy and to allow the deflected fluid to escape results in a loss of potentially useful energy. Further, as the fluid used for forming the curtain is generally air drawn in from the surrounding atmosphere, this air has to be speeded up to the speed of the vehicle, representing a substantial power requirement. In many cases the fluid forming a curtain has a final direction of movement which is in the same direction as that of the vehicle. Thus by the provision of means for recovering back into the vehicle at least some of the fluid which has formed a curtain it is possible to make use of at least part of the kinetic energy still possessed by the fluid. Alternatively, or in addition, where the conditions apply, it is possible to save power by taking in air which is already moving in a direction which is the same as that of the vehicle.

An object of the present invention is to provide means whereby at least part of the fluid forming a curtain is recovered into the vehicle for reuse, either for forming a further curtain or for re-circulation in the original curtain.

It is a further object of the present invention to provide means for re-energising the recovered fluid before it s reused.

Generally all of the curtain-forming fluid is not recovered and it may be necessary or desirable to supply additional fluid and it is a further object of the present invention to provide means for supplying additional fluid for adding to the recovered fluid. However, the necessity or desirability of supplying additional fluid together with the feature of re-energising the recovered fluid can be combined by using the additional air to re-energise the recovered air and thus avoid the necessity of either conveying the recovered air to and from a re-energising means such as a compressor, or positioning re-energising means at various positions in the vehicle. In both these latter arrangements considerable space is taken up by ducts, and it is another object of the invention to provide one or more injectors for re-energising the recovered fluid, the injectors fed with a comparatively small amount of higher energy fluid.

Various configurations for recovering and reusing the curtain-forming fluid, and for re-energising the recovered fluid, are described in the previously mentioned, now-abandoned applications Ser. Nos. 809,699 and 837,428.

As a matter of terminology, ports used for supplying new air, i.e., air which has not hitherto been used to form a curtain, will be referred to as "supply ports." Ports which are used to remove air from beneath the vehicle with a view to transferring it to other ports will be referred to as "inlet transfer ports," while the ports to which the inlet transfer ports transfer air will be called "outlet transfer ports." Ports through which both new air and air from an outlet transfer port is supplied will be referred to as "supply and outlet transfer ports." Similar terminology will be used for ducts connected with the respective ports, i.e., ducts leading to supply ports will be called "supply ducts," while ducts leading to or from transfer ports will be called "transfer ducts." Where there is more than one port of a kind, such ports will be referred to as "inner" or "inboard" and "outer" or "outboard" with respect to each other.

It is preferred, as described in the aforesaid Patent No.

3,363,716, to eject the curtain-forming fluid inwards relative to the periphery of the vehicle at a substantial angle to the vertical, and it will be assumed in what follows that this course has been adopted. Preferably the fluid is ejected at an angle of about 45° to the horizontal, but other angles may be used. Particularly, it should be noted that the feature of recovering the curtain-forming fluid enables angles of ejection to be used which are normally not so efficient.

Again, in the following description it has been assumed that the fluid used is air, although other fluids, such as exhaust gases, steam, water and mixtures thereof can be used. Further, for simplicity, it will be assumed that all the ports are of a continuous form, although it will be understood that in many examples, it is possible to provide a series of separate or individual ports positioned side by side immediately adjacent to each other or spaced a small distance apart.

Figure 2:
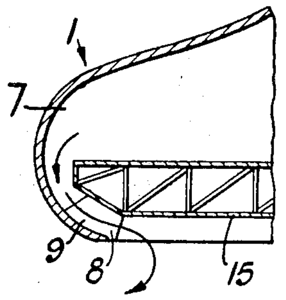
Figure 3:
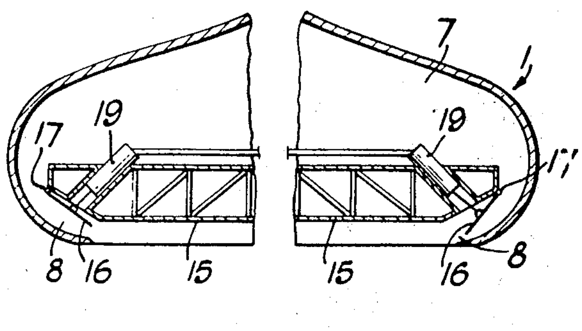
Figure 10:
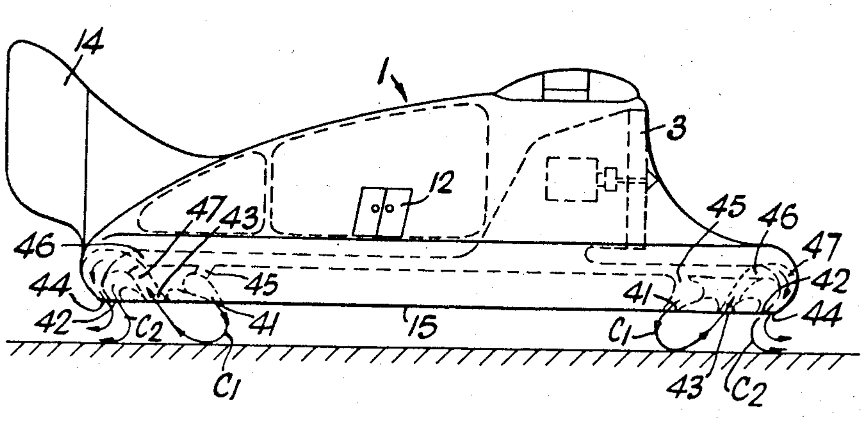
Figure 11:
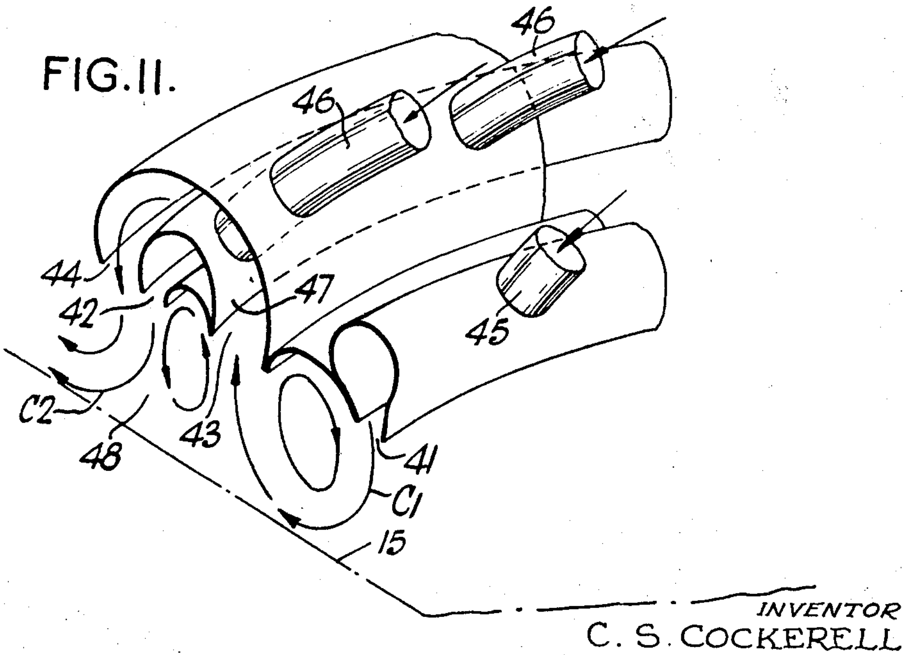
Figures 12, 13, 14, 15:
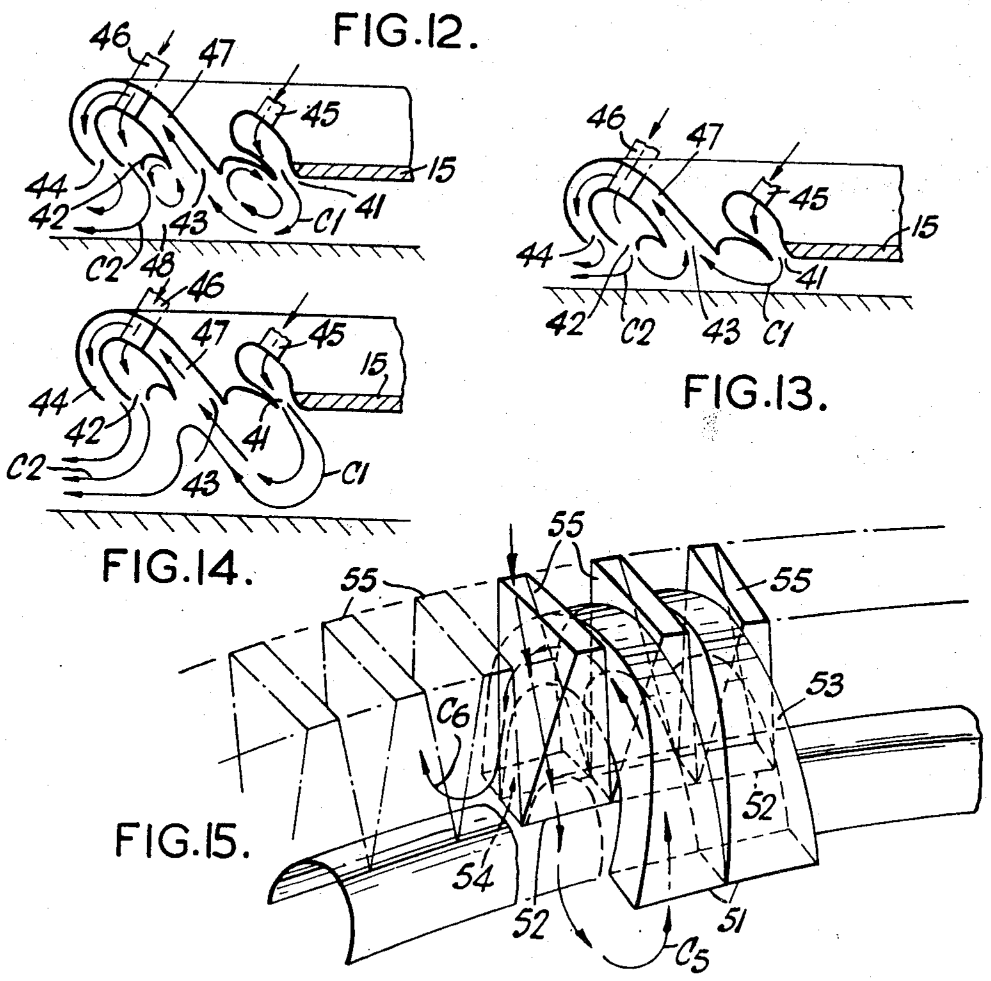
Figure 16:
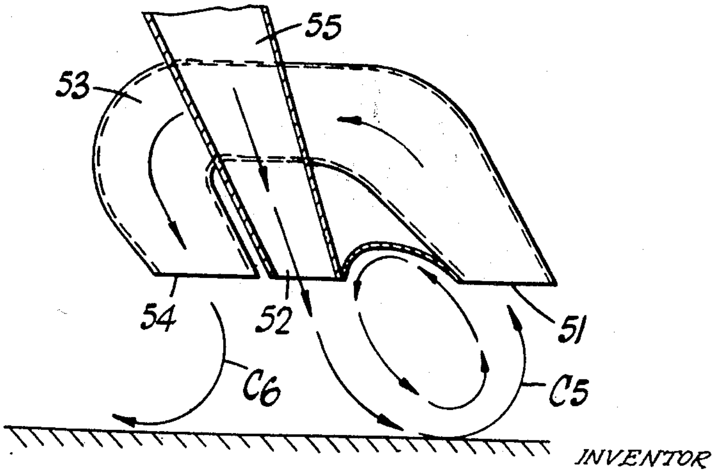
Figures 17, 18:
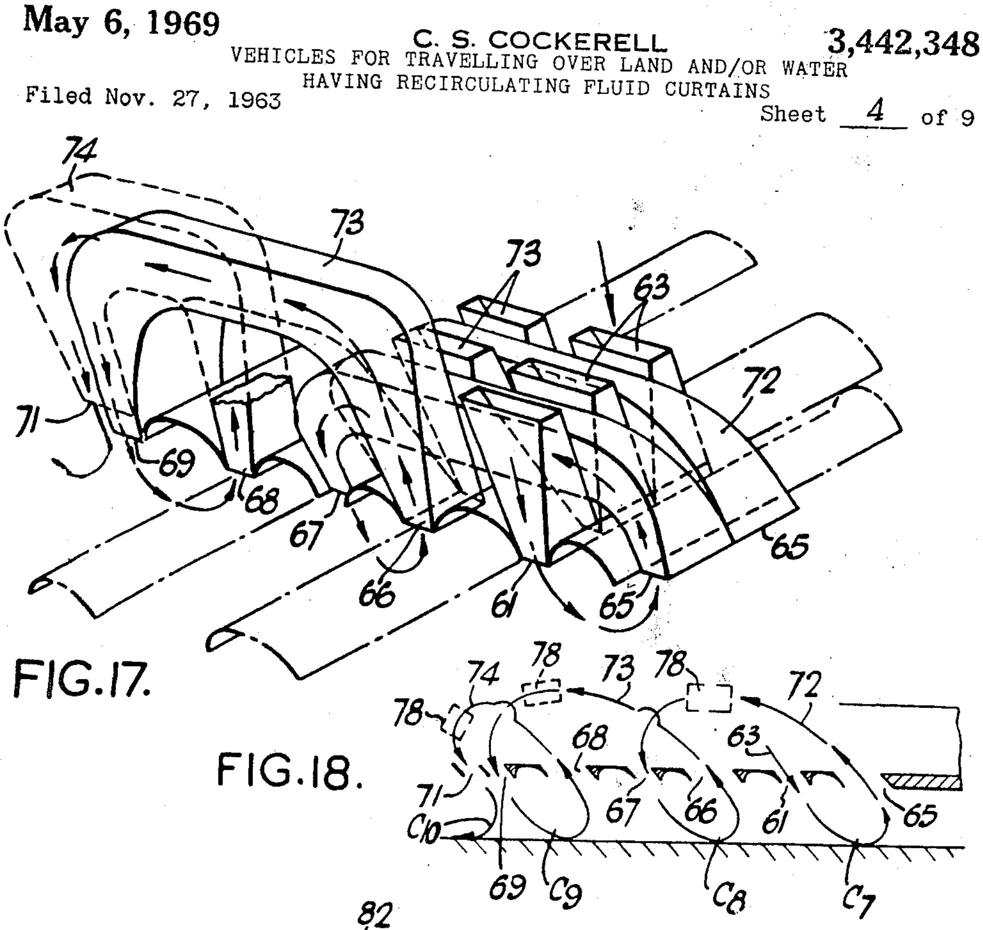
Figure 19:
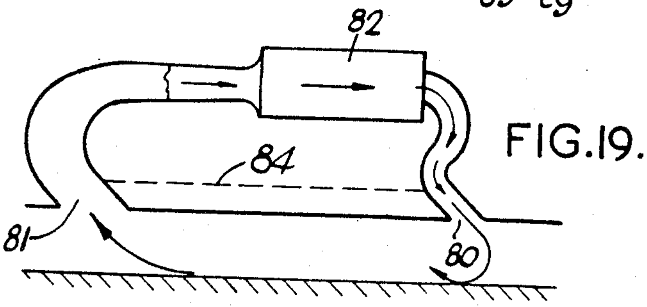
Figure 21:
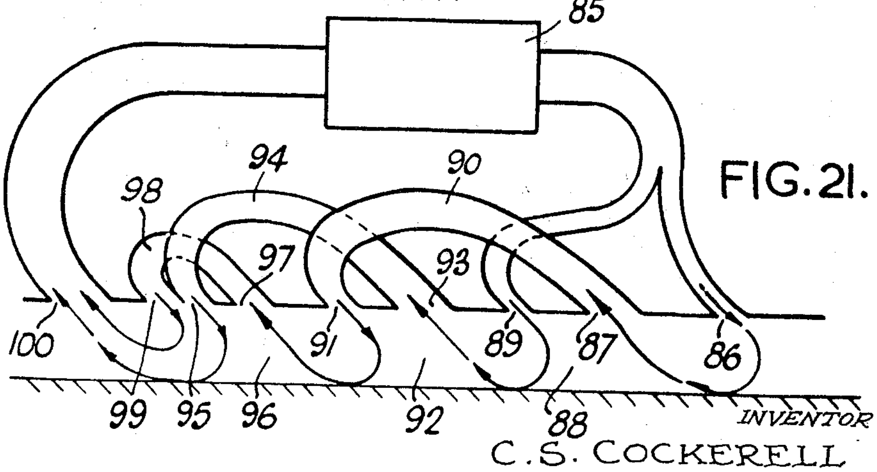
Figure 20:
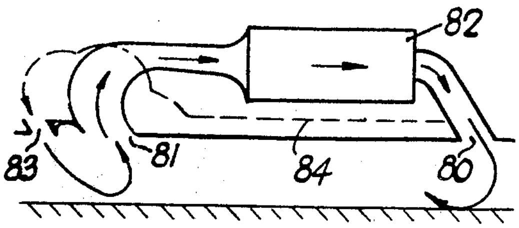
Figure 22:
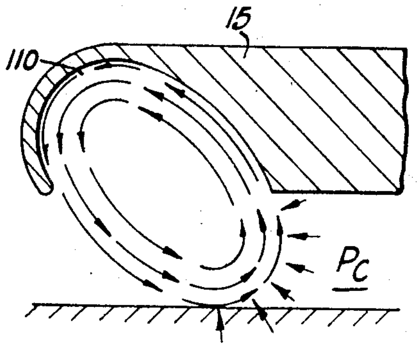
Figure 23:
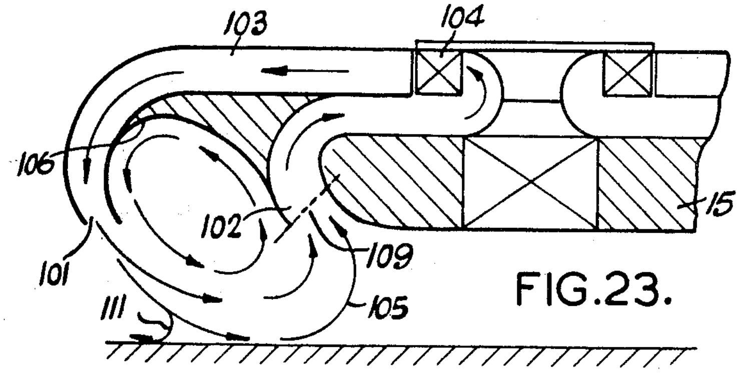
Figure 24:
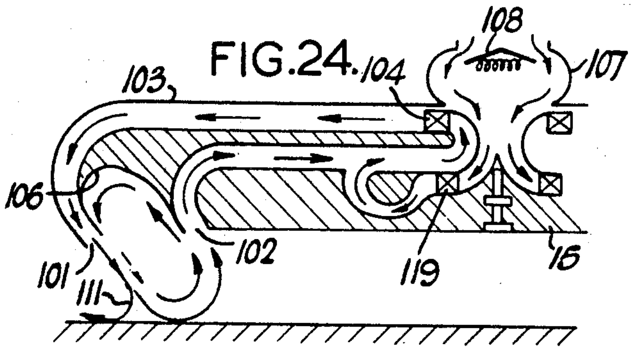
Figure 25:
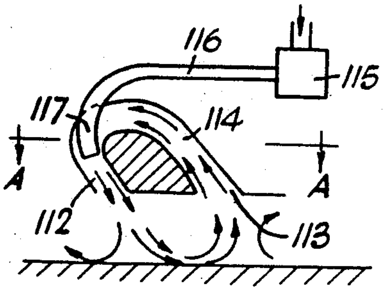
Figure 26:
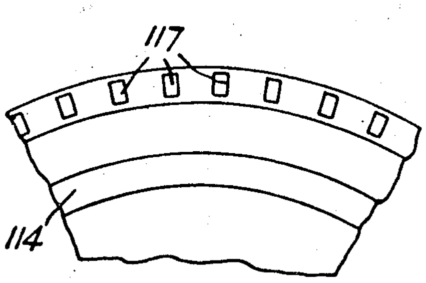
Figure 27:
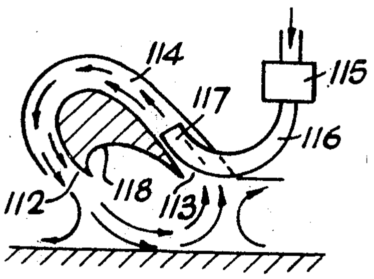
Figure 28:
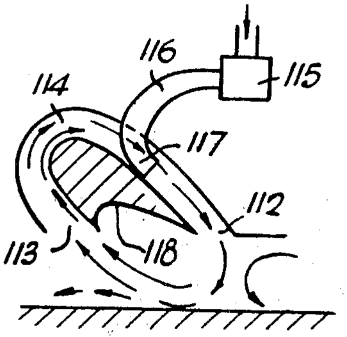
Figure 29:
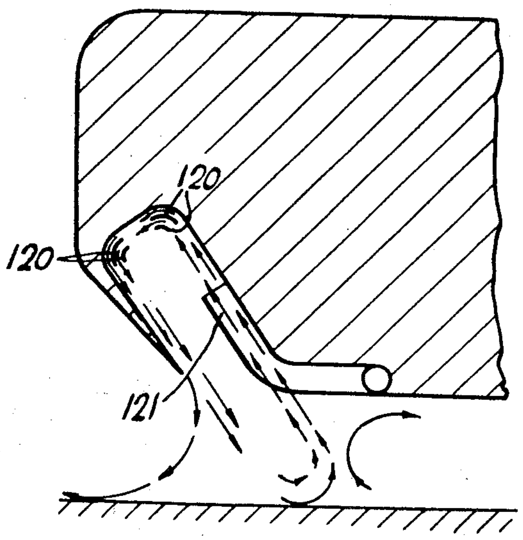
Figure 30:
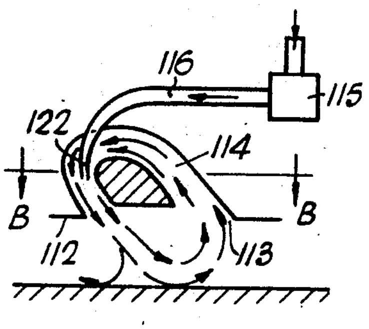
Figure 31:
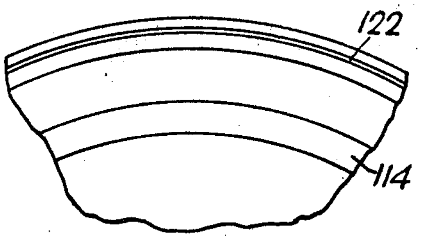
Figure 32:
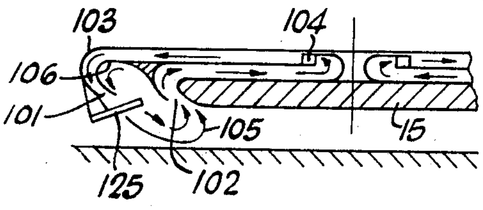
Figure 33:
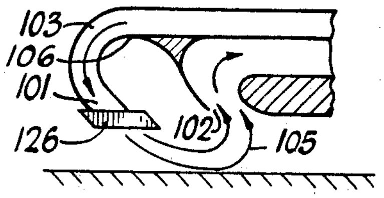
Figure 34:
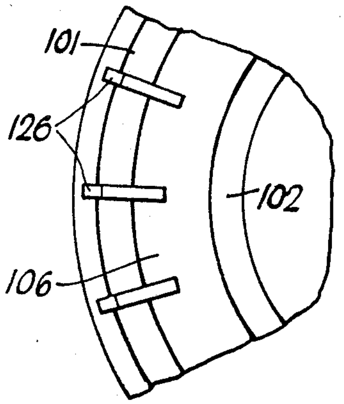
Figure 35:
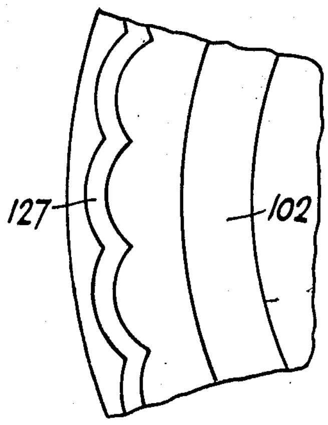
Figure 36:
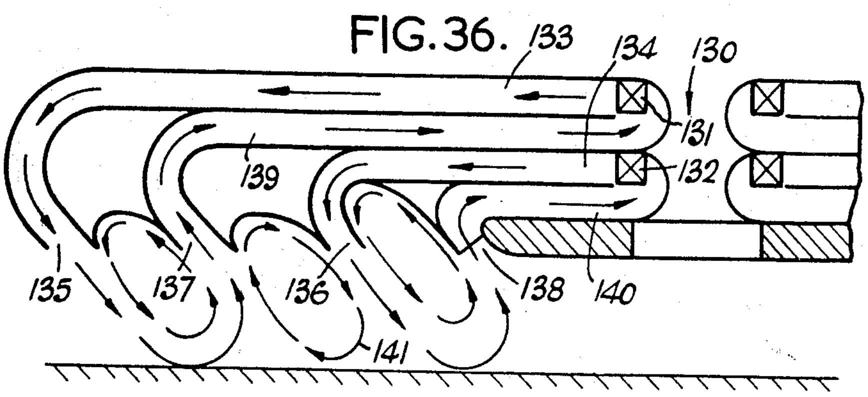
Figure 37:
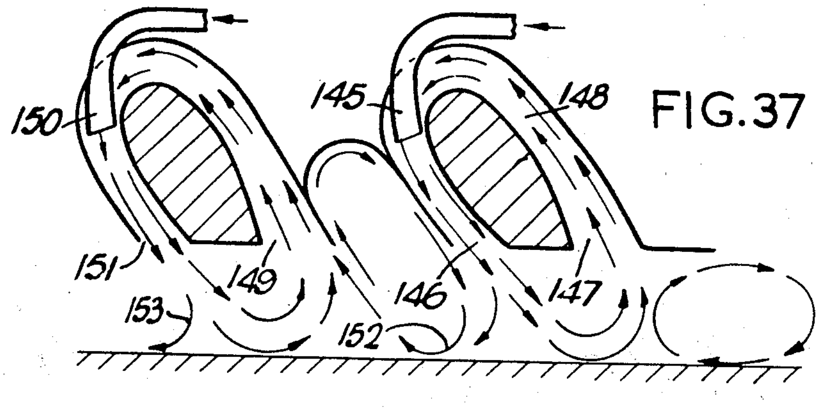
Figure 38:
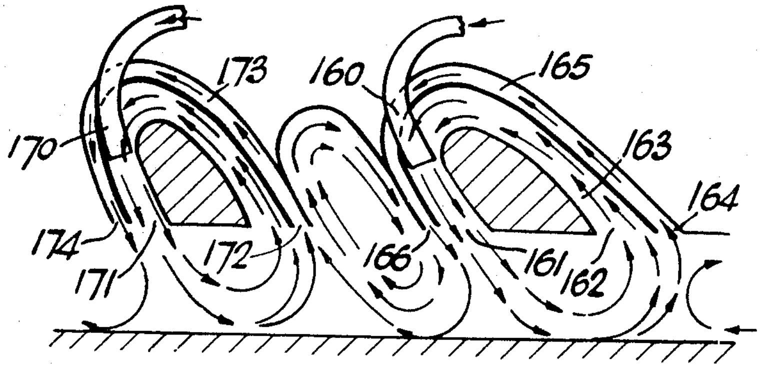
Figure 39:
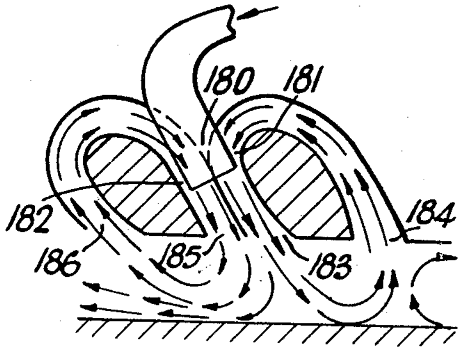
Figure 40:
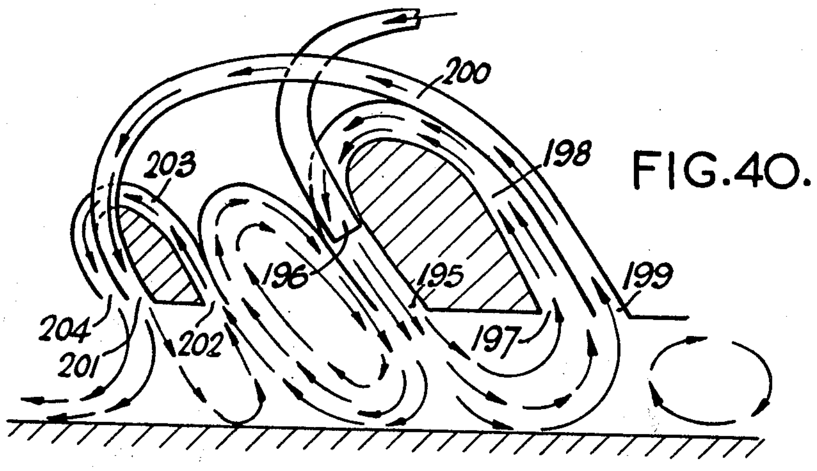
Figure 41:
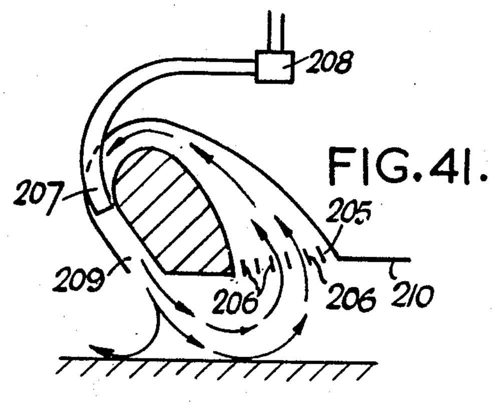
Figure 42:
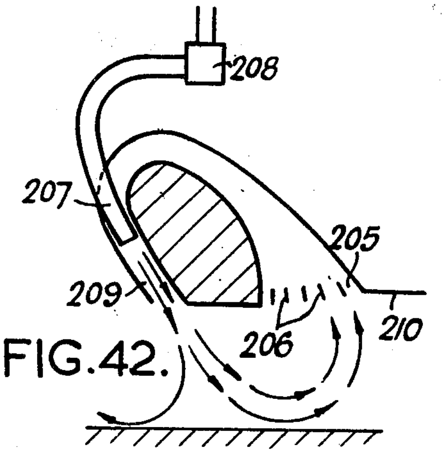

For a better understanding of the invention, and to show how the same may be carried into effect, reference will now be made to the accompanying diagrammatic drawings in which:

FIGURE 1 is a side elevation of a vehicle for travelling over land and/or water of the kind to which the present invention is directed, FIGURE 2 is a fragmentary cross-sectional view of part of the vehicle shown in FIGURE 1 showing one construction for discharging a curtain-forming jet of air from the underside of the vehicle, FIGURE 3 is a fragmentary cross-sectional view of a modified jet discharge which includes means for attenuating the jet curtain at one or the other side of the vehicle, FIGURES 4–9 illustrate the deflection requirements of a fluid curtain necessary to maintain a positive cushion pressure, FIGURE 10 is a side elevation of a vehicle provided with one arrangement of ports and ducts for producing both a primary and a secondary fluid curtain in accordance with the present invention, FIGURE 11 is a fragmentary perspective view of the ports and ducts provided in the vehicle of FIGURE 10, FIGURES 12, 13 and 14 are fragmentary sectional views showing how the air flow pattern obtained with the arrangement of FIGURE 11 varies when the vehicle is at different heights, FIGURE 15 is a fragmentary perspective view of a modified port and duct arrangement embodying the invention, FIGURE 16 is a sectional view of the arrangement of FIGURE 15, FIGURE 17 is a fragmentary perspective view of a multi-stage arrangement of ports for producing a plurality of curtains, with inward recovery, FIGURE 18 is a diagrammatic sectional view showing the air flow pattern of the arrangement of FIGURE 17, FIGURES 19 and 20 illustrate diagrammatically multi-stage arrangements, the stages being in series with each other, with outward recovery, FIGURE 21 illustrates in greater detail, a particular form of the multi-stage arrangement illustrated in FIGURE 19, FIGURE 22 is a fragmentary view illustrating the formation of a curtain in the form of a toroidal vortex, FIGURE 23 is a fragmentary sectional view of an arrangement for energising a single-stage closed recirculatory curtain in accordance with the invention, FIGURE 24 is a fragmentary sectional view showing a modification of the arrangement of FIGURE 23 wherein means are provided for increasing the intake pressure of the vortex energising blower, FIGURE 25 is a fragmentary vertical sectional view illustrating the energisation of a vortex type curtain by injector means, FIGURE 26 is a section on the line A—A of FIGURE 25, FIGURE 27 shows a modification of the arrangement shown in FIGURE 25, FIGURE 28 shows a further modification of the arrangement shown in FIGURE 25, FIGURE 29 is a fragmentary vertical sectional view of a further form of curtain, somewhat similar to a vortex, FIGURE 30 is a fragmentary vertical cross-section similar to that of FIGURE 25 illustrating an alternative form of injector means, FIGURE 31 is a cross-section on the line B—B of FIGURE 30, FIGURE 32 shows a modification of FIGURE 23, illustrating means for supplying air to the centre of a vortex curtain, FIGURE 33 illustrates a further means for enabling air to be fed to the centre of a vortex, FIGURE 34 is a fragmentary bottom plan view of the arrangement illustrated in FIGURE 33, FIGURE 35 is a fragmentary bottom plan view of a particular supply port configuration, FIGURE 36 illustrates a multi-stage arrangement, the stages being in parallel, FIGURE 37 is a fragmentary sectional view illustrating a multi-stage arrangement of vortex form, with injector energisation, FIGURE 38 is a fragmentary vertical section illustrating a modification of the arrangement shown in FIGURE 37, FIGURE 39 is a fragmentary vertical section illustrating a further modification of the arrangement shown in FIGURE 37, FIGURE 40 is a fragmentary vertical section illustrating a further multi-stage arrangement, FIGURE 41 is a fragmentary vertical section illustrating a modification of FIGURE 25, showing the fluid flow path at one operating height, and FIGURE 42 illustrates the fluid flow path in the arrangement illustrated in FIGURE 41 at an increased operating height.

Referring now to FIGURES 1 and 2 of the drawings, there is shown a vehicle 1 for travelling or hovering over land and/or water of the character disclosed in the aforesaid Patent No. 3,363,716. The vehicle body is streamlined and generally egg-shaped in plan view, being narrower at the rear end than at the front end, and has a flat bottom 15. At its front end, the vehicle body has an intake opening 2 in which a propeller 3 is mounted, there being a motor 4 for rotating the propeller 3 which is connected to the motor 4 by means of a driving shaft 5. The intake opening 2 leads into a chamber 6 formed in the vehicle, and the chamber 6 in turn communicates with a peripherally extending tunnel 7 leading to a peripherally extending annular mouth or port 8 formed around the bottom 15 of the vehicle. The port 8 is subdivided by a plurality of vanes 9 which are so arranged that, when a jet of air is forced through the port, the jet is directed with a velocity component which is inwards relative to the periphery of the vehicle body and with a mean resultant velocity component which is rearwards of the vehicle.

Located above the chamber 6 is a cockpit 10 for the pilot of the vehicle, from whence the pilot can control the vehicle. A hold or bay 11 is formed behind the chamber 6, the hold 11 being adapted for the reception of the load the vehicle is to carry. There are doors 12 which lead into the hold 11 and the vehicle can be loaded by conveying the goods up a ramp. The hold 11 may, however, be adapted for the reception of passengers, in which case the walls of the hold will be provided with windows (not shown). The vehicle has, at its rear end, a tail-plane 14 which may be used to assist in steering the vehicle.

In the operation of the vehicle, the motor 4 rotates the propeller 3 which induces a large volume of air through intake opening 2 into the chamber 6 from whence the air passes through the tunnel 7 and out of the port 8. Assuming for the moment that the vanes 9 do not direct the air with a velocity component which is rearwards of the vehicle, i.e., the vanes are effectively omitted, then the air forms a curetain C extending peripherally from and enclosing the bottom 15 of the vehicle, the curtain marginally delineating a space between the underside of the vehicle body and the ground or other surface over which the vehicle is to hover or travel, the horizontal cross-sectional area of which space is a number of times larger than the total cross-sectional area of the intake opening 2 or the port 8. The curtain initially extends almost horizontally beneath the vehicle, but sufficient pressure soon builds up beneath the vehicle to deflect the curtain so that it travels across the gap between the vehicle and the ground and impinges upon the ground. As the pressure rises in the space enclosed between the curtain, the bottom of the vehicle and the ground, the pressure will act upon the curtain and will further deflect the same to a position where, when seen in vertical section as shown in FIGURE 1, the curtain C will follow a curved path with a mean radius of curvature R equal to about half the height H of the bottom of the vehicle from the ground and with a centre of curvature disposed outside the envelope and substantially vertically beneath the peripheral edge of the bottom of the vehicle. The pressure $P_C$ within the envelope can build up rapidly to the point where the vehicle is supported upon the air trapped within the envelope so that the vehicle is sustained over the ground upon an air cushion just as effectively as though the vehicle were resting upon a balloon tire.

As indicated above, the pressure within the envelope will automatically build up to that required for the support of the vehicle itself. It will, however, be appreciated that as the continuous curtain is being established with the aid of the jet, the envelope may be directly filled by forcing air through an appropriate orifice in the bottom of the vehicle.

Once the vehicle is in spaced relationship from the ground and supported upon the air cushion within the described envelope, the vehicle may be propelled forwardly over the ground by the overall backward inclination of the jet curtain due to the overall backward inclination of the vanes 9, since the jet curtain possesses a component which will react upon the vehicle in a horizontal plane to cause the same to be translated over the ground whilst in spaced relation therefrom. Although for simplicity the movement of the vehicle has been considered in two parts, namely, purely vertical movement with the vanes 9 effectively omitted and forward movement due to the backward inclination of the vanes, it will be appreciated that the actual movement of the vehicle is a combination of the two movements and that the curtain of air will have a somewhat different shape from that described.

As the vehicle gathers speed, the head pressure will increase and may well approach the pressure of the air within the envelope on which the vehicle is supported. It will be evident that when the head pressure and the envelope pressure are equal there is no necessity to maintain that part of the curtain at the forward end of the vehicle, although, of course, sufficient of the sides of the curtain and the after end thereof must be preserved as will ensure that the appropriate pressure will be maintained beneath the vehicle for the support thereof.

In the arrangement described above, the annular port 8 through which the jet is projected directs the jet mainly inwards, as indicated in FIGURES 1 and 2. As an alternative the port 8 may be such that the jet is directed vertically downwards so that the curtain strikes the ground with the result that the air will flow both inwardly beneath the bottom of the vehicle and outwardly away from the bottom of the vehicle. Hence, pressure will begin to rise in the space enclosed between the curtain, the underside of the vehicle and the surface beneath the vehicle. The pressure will again act upon the underside of the vehicle so tending to lift the vehicle, and will also act upon the enveloping curtain thereby causing the lower part of the curtain adjacent the ground to become bell-mouthed. As seen in vertical section, the curtain will then be an arcuately extending jet having a centre of curvature outside the envelope formed by the curtain and a radius of curvature substantially equal to the height of the bottom of the vehicle from the ground.

Since the performance of the vehicle depends upon the cushion area enclosed by the jet curtain it follows that for optimum results the jets should be arranged at or near the periphery of the vehicle and projected from the lower part thereof, and that the vehicle should be arranged to have as large a diameter as possible.

If the jets are arranged to discharge vertically downward, the curtain is deflected through a smaller angle than when the curtain is ejected inwards towards the cushion space. The pressure which will be contained by the vertical curtain will therefore be less than the pressure contained by an inwardly ejected curtain. It will thus be seen that the performance of a vehicle having downwardly directed jets is not as good as that of a vehicle having inwardly directed jets. It will also be appreciated that the contained pressure will increase as the jets forming the curtains are ejected inwardly at increasing angles to the vertical.

The vehicle shown in FIGURES 1 and 2 is intended for predominantly forward travel and is steered only by the tailplane 14, the forward propulsion being obtained by virtue of the backward inclination of the vanes 9. However, where it is desired to move the vehicle in any direction it becomes necessary either to provide means for altering the inclination of the vanes 9, or to provide means for locally altering the width of the port 8 since by making the jet curtain thinner at one side of the vehicle than the other the vehicle will move in the direction of the attenuation of the curtain. This is due to the fact that the vehicle drops at the position at which the curtain is attenuated, with the result that the curtain pressure produces a resulant thrust towards that position. By asymmetrical attenuation of the curtain at two points it is possible to produce a turning moment on the vehicle for steering. It will be understood that local attenuation of the curtain alters the trim of the vehicle and conversely a lack of trim can be adjusted by local attenuation of the curtain.

Referring now to FIGURE 3, there is shown an arrangement for attenuating the jet curtain at one or the other side of the vehicle. Two flaps 16 are pivotally secured at 17 in the port 8. Each flap 16 is displaceable about its pivot 17 with the aid of a hydraulic motor 19. Thus on one side of the vehicle a flap 16 can be displaced outwardly so as effectively to reduce the width of the port 8, whilst on the other side of the vehicle the flap 16 can remain in its inner position. In this way the vehicle will tend to turn about that side where the flap has been outwardly displaced.

The vehicle above described is capable of travelling over land or over sea at high speeds, and the body of the vehicle is designed to obtain aerodynamic lift, so as to assist in supporting the vehicle. It is obvious, however, that the same construction may be embodied in a vehicle which, while capable of moving from place to place over land or water, normally functions as a relatively stationary platform, such as a radar picket vessel.

In the above description, reference has been made to the building up of a pressure within the space enclosed by the jet curtain sufficient to support the weight of the vehicle. It is convenient to consider that an air cushion of uniform pressure can be established. In practice, the pressure within the cushion will not be uniform, but this is of little consequence provided that the mean pressure, when multiplied by the plan area of the surface on which it acts, is equal to the weight of the vehicle less the, or any, resultant downward thrust which may be obtained from the jet curtain itself, and less any aerodynamic lift that the vehicle may experience during motion. Although the motion of the vehicle may, in the way described above, arise as the result of asymmetry of the jet curtain itself, it is to be understood that the vehicle may be equipped with engines specifically and separately for the purpose of propelling it.

From the description above it will appear that the jet curtain may be directed mainly inwards, i.e. horizontally, or, alternatively, vertically downwards or at any angle between. In practice, the jet curtain will be directed at angles between the horizontal and vertical depending upon the component of downward thrust it is desired to employ for counteracting the weight of the vehicle. This component will in turn be determined by the ratio of the total jet thrust in relation to the weight of the vehicle, and by the locality in the vehicle where the latter is asymmetrical in plan.

Turning now to the improved devices of the present invention, it will be understood that the structures diagrammatically illustrated in the drawings are intended to be embodied in vehicles of the same basic character as those above described and also disclosed in Patent No. 3,363,716. However, since the improvements are particularly directed to novel arrangements of ports and ducts for so circulating the jet fluid as to form one or more curtains in addition to a primary or initial curtain which may be formed as previously described, or for causing at least some of the fluid to recirculate in the primary curtain and thereby produce a closed recirculatory curtain which in some instances is in the form of a vortex, the improvements have been illustrated diagrammatically and separate from the rest of the vehicle in order to facilitate an understanding of the principles involved.

For the air forming a curtain to be recovered into the vehicle, it is necessary that there should be a pressure distribution underneath the vehicle such that the air, after being ejected in a downward direction, is deflected round and upwards towards the bottom of the vehicle. This pressure distribution is necessarily such that the air is deflected in the required direction. Alternatively, or in addition to a pressure distribution, a velocity head should exist in the direction in which the air is to deflect. Further, to produce a pressurised cushion beneath the vehicle the deflection must be asymmetrical, as will now be explained.

Figure 4:
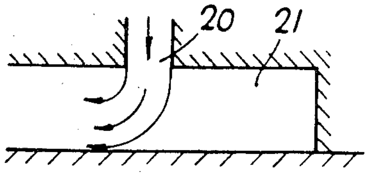
Figure 5:
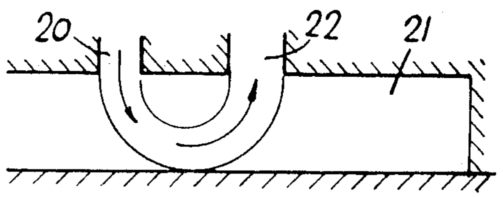

Considering first a curtain-forming jet which is ejected vertically downward from a supply port 20 in FIGURE 4. As stated above, initially the jet divides, part flowing inward toward the space 21 and part flowing outwards. A pressure is built up in the space 21 which deflects the inward flowing part of the jet, the flow finally being as in FIGURE 4. If now it is desired to recover the curtain-forming air, an inlet transfer port can be provided outboard or inboard of the supply port 20, the air being sucked in through the inlet transfer port. FIGURE 5 illustrates an arrangement in which an inlet transfer port 22 is positioned inboard of the supply port 20, but this will not produce a positive pressure in the space 21 as the inlet transfer port 22 will have to be held at a negative pressure to suck the air up into the port. As explained above, the angle through which the jet of air is deflected depends upon the pressure which deflects it and conversely the pressure contained by the jet of air is dependent upon the angle through which the contained pressure deflects the jet of air. In FIGURE 5, assuming atmospheric pressure external to the supply port 20, the whole of the jet will only flow inwards if a suction is maintained inboard of the supply port. However, this suction will, of course, also deflect the jet round and upward into the inlet transfer port 22. Since no deflection of the jet occurs by a pressure in the space 21, this pressure must, therefore, be substantially atmospheric. If the atmospheric pressure external to the supply port 20 varies, so the pressure in the space 21 will correspondingly vary.

Figure 6:
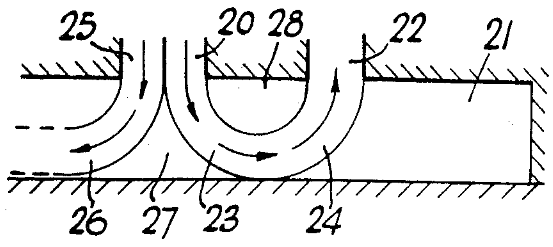

FIGURE 6 illustrates a modifiaction of FIGURE 5 which will produce a positive pressure in the space 21 but, as will be explained, produces a positive pressure which is lower than an arrangement in which no inlet transfer port 22 is provided. In this example a second supply port 25 is positioned outboard of and immediately adjacent to the first supply port 20. The jet 26 issuing from the supply port 25 has the same mass flow, or energy content, as the jet 23 issuing from supply port 20 and produces and sustains a pressure in the region 27 which is sufficient to deflect the jet 26 outwards and the jet 23 inwards. A pressure is then built up in space 21 which is sufficient to deflect the part 24 of the inner jet upward into the inlet transfer port 22. However, since the surface in which the ports, 20, 22 and 25 are formed is flat and horizontal, the radii of the curves through which the jets of fluid are deflected are all the same, and theoretically the pressure at 21 is the same as at 27 and therefore there is no gain from the inner jet whatsoever. The pressure at 21 could be formed and maintained by the outer jet 26 alone. In practice the position is worse as a closed region 28 is formed by the deflection of the inner jet 23, and because air is induced from this region by the flow of the inner jet, a sub-atmospheric pressure occurs in the region 28. This low pressure assists in deflecting the inner jet and as a result the pressure in the space 21 is less than that theoretically attainable. It will thus be seen that the provision of the inner, recovered, jet has a negative effect, reducing the efficiency of the outer jet 26. Any effect of a re-energising means used for re-energising the recovered air which is produced at the inlet transfer port 22, such as a suction at the inlet to the re-energising means, will further assist in deflecting the part 24 of the inner jet with a resulting lowering of the pressure in the space 21.

Thus, there is a symmetrical deflection of the jet in FIGURE 5 which, as explained, will not produce an increased pressure, whilst in FIGURE 6 there is an overall asymmetry in the deflections, which results in an increased pressure, but again the symmetrical part of the deflection does not add to the pressure increase resulting from the asymmetrical part of the deflection.

Figure 7:
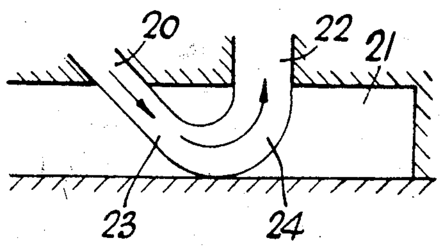
Figure 8:
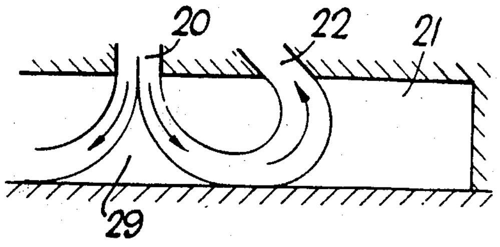
Figure 9:
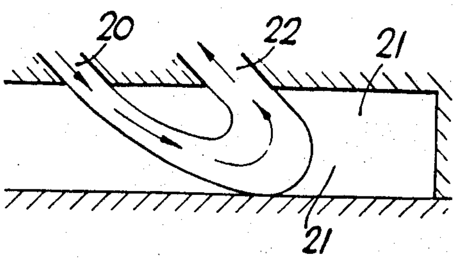

If the deflection of the inner jet can be made asymmetrical this jet will form and maintain a pressure increase without the provision of a further, outer, jet. The deflection can be made asymmetrical in several ways, the simplest being to incline the supply port 20 so as to eject the curtain-forming jet inwards as shown in FIGURE 7. The deflection of the two parts 23 and 24 of the jet are now asymmetrical and an increased pressure is maintained in space 21. Further, a velocity head exists in the jet in the direction in which it is desired the jet should go. Alternatively, the inlet transfer port can be inclined, as in FIGURE 8, or both ports inclined, as in FIGURE 9. The arrangement of FIGURE 8 is less efficient than the arrangements of FIGURES 7 and 9 as part of the jet is deflected outwards to maintain a pressure at 29 which deflects the remainder inwards but a net increase in pressure will be produced by the inner part of the jet. It will be appreciated that other arrangements can be provided whereby an asymmetrical deflection can be obtained.

Although the above explanation is concerned with the arrangement in which the curtain-forming air is recovered at a position inboard of the position from which the curtain-forming fluid issues, the same requirements for asymmetrical deflection apply for arrangements in which the curtain-forming fluid is recovered at a position outboard of the position from which the curtain-forming fluid issues. One way is to incline only the inlet transfer port, which is as FIGURE 7 but with the flow reversed; an alternative is to incline both ports, as in FIGURE 9 again with the flow reversed. However, the outward flowing air will not normally deflect upwards into the inlet transfer port unless, as stated above, there is a pressure distribution underneath the vehicle which will cause deflection of the air. This can be provided in two ways, (i) a further supply port is provided outboard of the inlet transfer port, the curtain issuing from this further supply port forming a further cushion of pressurised air which will deflect the outward flowing air of the first curtain upward into the inlet transfer port, or (ii) a suction must be created at the inlet transfer port sufficient to cause upward deflection of the outward flowing air. A combination of the two can also be used.

In the examples illustrated in FIGURES 4 to 9, the space 21 has been considered as being bounded on one side only by a curtain of air, but in a vehicle the space may be bounded for its entire periphery by one or more curtains of air or by combinations of structural members and curtains of air. In all cases, it is of course essential that the area of the space 21 is sufficient to produce, at the pressure maintained in the space 21, an upward thrust sufficient to support the vehicle or at least the major part of the weight of the vehicle. It is therefore desirable to produce the curtain as close to the periphery of the bottom of the vehicle as possible, as the area of the space 21 is bounded approximately by the inner edge of the inlet transfer port 22 where this is inboard of the supply port 20, or by the inner edge of the supply port, where this is the innermost port.

Turning now to various embodiments of the invention, FIGURES 10–14 illustrate an arrangement in which the air forming an inner curtain is recovered at a position outboard of the position from which the air initially issues, the necessary pressure distribution being formed by a further curtain formed outboard of the position at which is recovered air forming the inner curtain. FIGURE 10 shows a vehicle of the type illustrated in FIGURE 1 with modified ports and ducting, FIGURE 11 is a fragmentary perspective view of the said ports and ducting and FIGURES 12–14 are diagrammatic sectional views to illustrate more clearly the air flow patterns obtained at different heights.

In the structures illustrated in FIGURES 10–14, the bottom 15 of the vehicle 1 is provided with an inner supply port 41 inboard of the vehicle periphery, an outer supply port 42 outboard of supply port 41, an inlet transfer port 43 positioned between the inner and outer supply ports 41 and 42. The spacing of the ports 41, 42 and 43 is such that a small distance separates port 43 from port 41 and port 42 from port 43. An outlet transfer port 44 is positioned outboard of and immediately adjacent to the outer supply port 42. The supply ports 41 and 42 receive air under pressure through supply ducts 45 and 46 respectively, from any suitable source within the vehicle, for example the propeller 3, while inlet and outlet transfer ports 43 and 44 are connected by a transfer duct 47. The air from the outer supply port 42 may be at the same pressure as or at a lower pressure than that from the inner supply port 41. The air issues from the supply ports 41 and 42, and from the outlet transfer port 43, in an inward direction, thus producing an asymmetrical deflection.

As indicated by the arrows in FIGURE 12, when the vehicle is operating at a particular height in relation to the geometry of the system, the jets issuing from supply ports 41 and 42 form inner and outer curtains $C_1$ and $C_2$, respectively, and the air of the inner curtain, which, after deflection by the cushion pressure, flows outwardly away from the curtain, is deflected upwardly by the pressure at 48 and enters inlet transfer port 43 whence it is delivered to outlet transfer port 44 through transfer duct 47 and flows downwardly adjacent the air forming outer curtain $C_2$.

A change in the relative pressures between the ports or in the sizes of the ports and their relative positions will alter the air flow from the idealised pattern shown in FIGURE 12. For example, if outlet transfer port 44 is enlarged, some of the air issuing from the outer supply port 42 will split off from the main stream and flow back into inlet transfer port 43. The same result can be obtained by increasing the pressure of the air supplied through duct 46 or by increasing the width of supply port 42, whereby the pressure between the two supply curtains $C_1$ and $C_2$ is increased. Again this result occurs when the vehicle is at less than the height of FIGURE 12, as in FIGURE 13, as this also increases the pressure between the supply curtains. On the other hand, where the height is greater than that of FIGURE 12, as in FIGURE 14, the pressure is reduced and some of the air of inner curtain $C_1$ splits off from the main stream which enters inlet transfer port 43 and flows out underneath the outer jets. It will be appreciated that the air flow pattern will change from one mode to another during dynamic conditions of travel over a rough surface.

FIGURES 15 and 16 illustrate an arrangement wherein an inlet transfer port 51 is positioned inboard of a supply port 52 and is connected by transfer duct 53 with outlet transfer port 54 which is positioned outboard of and immediately adjacent to the supply port 52, the latter being supplied through supply ducts 55. With this arrangement, at least part of the air of the curtain $C_5$ formed by the jet issuing from supply port 52 flows back into inlet transfer port 51 and then issues from outlet transfer port 54 to form the curtain $C_6$. Again, the air issues from the supply port 52 in an inward direction, and the flow into the inlet transfer port 51 is also inclined, thus producing an asymmetrical deflection. As in the case of FIGURES 12–14 there are alternative modes of flow in the arrangement of FIGURE 15 depending on the relative positions and sizes of ports and air pressures, and on the height of the vehicle above the surface.

FIGURES 17 and 18 show a multi-stage expansion system which is effectively a repetition of the system of FIGURES 15 and 16, it being noted that the air is recovered after being deflected in an inboard direction.

In FIGURES 17 a supply port 61 supplied with air through supply ducts 63 is positioned outboard of a first or innermost inlet transfer port 65 and a second or outer inlet transfer port 66 is located outboard of supply port 61 and spaced a small distance therefrom. There are then provided, in order outwardly from the second inlet transfer port 66, a first or inner outlet transfer port 67 to which air is delivered from the first or innermost inlet transfer port 65 through inner transfer duct 72, a third or outermost inlet transfer port 68, and a second or outer outlet transfer port 69 to which air is delivered from the second inlet transfer port 66 through transfer ducts 73 and a third or outermost outlet transfer port 71 to which air is delivered from the third inlet transfer port 68 through transfer ducts 74. As indicated by the air flow arrows in FIGURE 18, this arrangement provides four curtains $C_7$, $C_8$, $C_9$, and $C_{10}$; and again the ports and ducts are so arranged that jets of fluid flowing in the same direction are adjacent, while jets flowing in opposite directions are spaced from each other. The air flow from the supply port 61 and from the outlet transfer ports 67, 69 and 71, issues in an initial inward direction, and also the flow into the inlet transfer ports is similarly inclined, producing an asymmetrical deflection.

The flow path of the air in the arrangement illustrated in FIGURE 17, is shown diagrammatically in FIGURE 18. Whilst the air can be recovered and used a further time, as in FIGURE 16, without being re-energised, when additional stages of recovery are provided, as in FIGURES 17 and 18, it is likely that re-energerisation of the recovered air will be required. This re-energisation can be any suitable means, such as a compressor or injector, as indicated diagrammatically at 78 in FIGURE 18, and which can be provided for any or all of the stages.

An analogous multi-stage system in which the air is deflected outwards before being recovered can also be produced. As explained above, it is necessary to provide a pressure distribution underneath the vehicle to deflect the air flow up into each inlet transfer port.

FIGURES 19 and 20 illustrate diagrammatically multi-stage arrangements in which the curtain-forming air is recovered outwardly, as mentioned above with the air being finally recovered and returned to the main blower or other energising source. Thus, in FIGURE 19, the air issues from an innermost supply and outlet transfer port 80, being finally recovered through an outermost inlet transfer port 81 and being fed back to the main energising means 82. In FIGURE 20 the arrangement is similar except that the outermost inlet transfer port 81 is inboard of the outermost outlet transfer port 83. The number of stages of recovery and reuse may vary as desired and is indicated in FIGURES 19 and 20 by dotted lines 84.

The arrangements illustrated in FIGURES 19 and 20 are purely diagrammatic in that, as explained above, for the successive stages of recovery to be attained, a correct pressure distribution must exist beneath the vehicle. This can be obtained in various ways one of which is illustrated in FIGURE 21. In FIGURE 21, air is fed from an energising means 85, corresponding to the energising means 82 in FIGURE 19, and issues from an inner supply and outlet transfer port 86, which corresponds to the supply and outlet transfer port 80 in FIGURE 19. The air issuing from the supply and outlet transfer port 86 is deflected round and outward by the cushion pressure to be recovered into an innermost inlet transfer port 87 outboard of and spaced a short distance from the supply and outlet transfer port 86. For the air to be deflected round and upward into the inlet transfer port 87, a pressure must exist at the region 88. This is created by a further flow of air fed from the energising means 85 to an outer supply and outlet transfer port 89 outboard of and spaced a short distance from the inlet transfer port 87. The flow of air from the supply and outlet transfer port 89 is deflected round and outward by the pressure in the region 88.

The air recovered into the innermost inlet transfer port 87 flows through an inner transfer duct 90 to an inner transfer port 91 outboard of the supply and outlet transfer port 89. The air issuing from the outlet transfer port 91 in turn creates a region of pressurised air at 92 which deflects the air from the supply and outlet transfer port 89 round and upward into an intermediate inlet transfer port 93 positioned between the ports 89 and 91 and also deflects the air from outlet transfer port 91 round and outward. From the inlet transfer port 93 the recovered air is fed through an intermediate transfer duct 94 to an outer outlet transfer port 95 outboard of the outlet transfer port 91. The air issuing from the outlet transfer port 95 creates a region of pressurised air at 96 which deflects the air from the outlet transfer port 91 round and upward into an outer inlet transfer port 97 positioned between the outlet transfer port 95 and the outlet transfer port 91, and also deflects the air flow from outlet transfer port 95 round and outwards. The air recovered into the inlet transfer port 97 is fed through an outer transfer duct 98 to an outermost outlet transfer port 99 outboard of and immediately adjacent to the outlet transfer port 95. The flows of air from the outlet transfer ports 95 and 99 are deflected into an outermost inlet transfer port 100 from which the air is fed back to the energising means 85, the inlet transfer port 100 corresponding to port 91 in FIGURE 19.

A similar arrangement can be used for the diagrammatic arrangement illustrated in FIGURE 20, the outlet transfer ports 95 and 99 being positioned outboard of the inlet transfer port 100.

In both inward recovery systems, as illustrated in FIGURES 16, 17 and 18, and in outward recovery systems, as illustrated in FIGURES 19, 20 and 21, variations can occur in the flow path of the curtain-forming air, as explained with respect to FIGURES 12–14.

The cushion pressure under the vehicle is a fraction of the curtain jet pressure. I have found that this fraction is a function of the ratio of jet width to hoverheight and increases as this ratio increases. In a multi-stage arrangement, the pressure under the vehicle decreases in steps and the values of the successive decrements, and therefore, the number of useful steps before the air is exhausted, depend on the ratios of the respective jet widths to hoverheight. Thus the greater the desired number of useful stages, the greater must be the ratios of jet widths to hoverheight.

A characteristic of these arrangements is that the momentum drag associated with the taking in of new air when the vehicle is in motion can be reduced, thus leading to a reduction in the power required to overcome the overall drag of the vehicle in motion.

According to a further feature of the invention, one or more curtains in the form of a toroidal vortex or the equivalent to a toroidal vortex, may be produced by recirculating the air in the manner hereinafter described.

An unconstrained vortex is circular, and in order that it may exist it must have a pressure gradient decreasing towards its centre which exactly counteracts the centrifugal force of the moving particles at any given radius. If a distorted vortex is to exist as in FIGURE 22, it is necessary that the forces external to it shall not be uniform but shall increase as the radius of curvature decreases. Such a vortex, when formed by a constraining surface 110 of the vehicle bottom 15 having the concave cross-section shown in FIGURE 22, requires the existence of a cushion pressure $P_C$ under the vehicle and conversely the distorted vortex provides the asymmetrical deflection required to produce the cushion pressure. This pressure can be built up whichever way the vortex rotates. If such a vortex is formed, the power required to sustain the cushion pressure is only that necessary to recoup the losses in energy which the vortex suffers.

It will be appreciated that the size of a vortex whose particles are flowing at a given speed is a function of the pressure gradient from the outside to the inside of the vortex. Since, in vehicles embodying the present invention, it is necessary to provide that the bottom of the vortex shall touch the surface of the ground or water at various heights of the vehicle, means can be provided for controlling the pressure gradient so as to enable a greater variation of height to be obtained, and further enable control of the relationship between input power and hoverheight for a given curtain pressure.

FIGURE 23 illustrates an arrangement in which the vortex is energised by means of a fan at least a part of the air being extracted from the system, re-energised and re-introduced.

The arrangement illustrated in FIGURE 23 comprises a supply and outlet transfer port 101, an inlet transfer port 102 inboard of the supply and outlet transfer port, a transfer duct 103 connecting port 102 to port 101, and a fan 104 in the transfer duct for supplying energy to the air so as to cause it to circulate round the circuit formed by the two ports and the transfer duct, and thereby produce a curtain 105, generally in the form of a vortex. The bottom 15 of the vehicle between supply and outlet transfer port 101 and inlet transfer port 102 is preferably in the form of a hollow channel 106, concavely curved in cross-section similarly to the construction illustrated in FIGURE 22, so as to accommodate the part of the curtain which circulates in the vortex without passing to the fan 104. The inlet transfer port 102 may give an aspect inclined to the horizontal, as shown by the chain line 109, to facilitate the collection of air at varying heights.

The structure illustrated in FIGURE 23 can be used to produce a vortex curtain which rotates clockwise, instead of counter-clockwise, by reversing the direction of the fan 104.

The air flow shown in FIGURE 23 is a closed circuit. Such an arrangement has a cushion pressure/height characteristic with certain undesirable features, such as a small range of heights at which the pressure is sufficient to support the vehicle. At heights above and below this range, the input of the fan 104 may be at a negative pressure. The undesirable features of the characteristic can be mitigated by arranging that additional air can be introduced into the system when the input of the fan falls below atmospheric pressure. In the single stage system illustrated in FIGURE 23 the input of the fan should be raised to atmospheric pressure or preferably a little above atmospheric. This can be effected by the arrangement of FIGURE 24, which shows a modification of the arrangement of FIGURE 23. The intake side of fan 104 may have access to the atmosphere through an opening 107 in the vehicle body which is controlled by a one-way flap valve 108 which opens automatically when the pressure at the fan intake falls below any desired value. The extra blades 119 of the auxiliary stage of the fan serve to raise the intake pressure of the main stage of the fan 104 somewhat above atmospheric.

In a multi-stage system as described below the datum pressure is no longer atmospheric but the pressure immediately outboard of the vortex in question, i.e. between adjacent vortices or outboard of the outermost vortex.

In the case of a vortex rotating in the opposite direction to that of FIGURE 23, it will be noted that the outer port 101 is now the inlet transfer port. In that case it is possible to rely on induction of air through port 101 to supply at least part of the necessary additional air to the system, although if the vehicle is designed to float on water, the duct must be cut back so that it is above the water level when the vehicle is floating.

In the examples of FIGURES 23 and 24, in addition to the necessity of supplying some additional air when the vehicle is operating at other than the normal clearance, it is unlikely that all the air will be retained in the circuit. Generally there is a small but steady loss of air, as indicated by the arrow 111 in FIGURES 23 and 24. This loss has to be made up by the supply of further, additional, air.

The air which is to be re-energized by the fan 104 has to be carried to and from the fan through ducts which take up a considerable amount of room, resulting in duct losses, the ducts themselves being quite heavy. It is possible to reduce the space required by the ducts, the weight of the ducts and the duct losses by energising only the additional air, this additional air then re-energising the main recirculatory flow by injector action. The additional air is energised to a pressure higher than the normal pressure of the curtain forming air and only small ducts are required from the fan and no ducts to the fan from the inlet transfer port.

FIGURES 25 and 26 illustrate an arrangement which produces a curtain system generally of the same form as that in FIGURES 23 and 24. In FIGURE 25 the main curtain air is expelled from a supply and outlet transfer port 112. The curtain bends round and the air enters air transfer port 113, passing through transfer duct 114 back to the supply and outlet transfer port 112. Air of higher energy is supplied from a compressor 115 through duct 116 to an injector nozzle 117. The injector nozzle is slot shaped and spans the thickness of the vortex as shown. Where, as in the vehicle described above, the curtain system is formed from annular ports around the periphery of the vehicle, the injector nozzles are spaced apart around the ducts feeding the ports, each nozzle extending approximately radially across the vortex. This is shown more clearly in FIGURE 26. The injector nozzles can be located in various positions around the circumference of the vortex cross-section, and they can also be arranged so that the vortex rotates in one direction or the other. FIGURE 27 shows the nozzles 117 nearer to the inlet transfer port 113 than in FIGURE 25. FIGURE 28 shows the nozzles 117 directed in the opposite direction to that in FIGURES 25 and 26, the vortex rotating in the opposite direction, and it will be appreciated that the nozzle 117 can also be located at different positions, as in FIGURES 25 and 27. The bottom surface between the ports 112 and 113 may be given a concave channel formation as shown at 118 in FIGURES 27 and 28.

It is well known that to achieve adequate mixing with injectors the length of the flow path bears a relationship to the spacing between any two adjacent injector nozzles and to avoid undesirable variations of the cross section of the vortex due to centrifugal force, the mixing should be substantially complete before the air is subject to centrifugal force. It is therefore possible that the configuration shown in FIGURE 27 will give more complete mixing in certain conditions. If such uniform mixing cannot be obtained before it is necessary to change the direction of flow, an effectively straight flow can be obtained by using deflectors, preferably in combination with a rectangularly shaped surface as shown in FIGURE 29. In this configuration, the air is deflected by banks of deflectors 120, the higher energy air being injected through nozzle 121 which is positioned to give the longest flow path before the air curtain curves round as it contacts the surface.

In an alternative arrangement the injectors may be in the form of separate arcuate nozzles or there may be one or more annular nozzles, as shown in FIGURES 30 and 31. FIGURE 30 shows a simple vortex curtain system and is similar to the construction shown in FIGURE 25, the nozzle 122 being annular instead of a radial slot shaped jet. This is more readily seen in FIGURE 31 which is a partial plan view. The nozzle 122 is a complete annulus, but if desired can be subdivided into separate arcuate sections. This subdivision may be a more convenient form of construction, when it is desired to provide means for varying the degree of re-energization at different points around the vehicle. An annular nozzle can also be used in the arrangement of FIGURE 29. More than one such annular nozzle or annular configuration of nozzles may be provided.

A further aid to wideing the range of heights over which the air curtain is effective is to prevent the pressure at the centre of the vortex from falling to too low a value. This may be effected by leading into the interior of the vortex a series of ducts. FIGURE 32 illustrates the provision of ducts 125 in an arrangement as shown in FIGURE 23. The ducts 125 are spaced round the circumference of the cushion contained by the curtain and open at one end into the centre of the vortex and at the other end open into a space outboard of the vortex curtain. Alternatively, as illustrated in FIGURES 33 and 34, the ducts 125 may be replaced by solid members 126 acting as air dividers and spaced around the outside periphery of the vortex and situated radially across the jet and vortex to break the continuity of the envelope at these points so as to open the interior of the vortex to the pressure outboard of it. Yet another alternative having a similar effect is illustrated in FIGURE 35. The supply and outlet transfer port 127 is given a scalloped formation as seen in plan. This increases the entrainment of air from outside the vortex.

As in the case of the multi-stage arrangements described above with reference to FIGURES 17 and 18, a plurality of ring vortex curtains may be provided so as to form a multi-stage arrangement. One construction is illustrated in FIGURE 36 in which a number of vortex curtains are energised by various stages of a single main fan. Alternatively separate energising means may be provided for the several vortices. The pressure of the air supplied to the vortices may vary for example decreasing from the innermost to the outermost vortex.

FIGURE 36 illustrates a fan 130 having two stages 131 and 132. The outputs from the two stages are delivered to two ducts 133 and 134 respectively, the ducts being connected with supply and outlet transfer ports 135 and 136. Positioned between the two supply and outlet ports 135 and 136 is an inlet transfer port 137, while a further inlet transfer port 138 is positioned inboard of the inner supply and outlet transfer port 136. The inlet transfer ports 137 and 138 are connected to the inputs of the two stages 131 and 132 respectively by ducts 139 and 140.

The air flows from port 136 downward and inward and is then deflected round and upward into port 138. Similarly air flows from port 135 downward and inwardly, being deflected round and upward into port 137. It will be seen that the inlet transfer port 137 is spaced from the supply and outlet transfer port 136 to provide sufficient space for the formation of an intercurtain vortex 141.

Preferably, in multi-stage systems of any form, the various streams of air are arranged so that where streams are immediately adjacent to each other they travel in the same direction, and where they are travelling in opposite directions they are separated to allow the formation of an intervening vortex. FIGURE 37 illustrates an injector energised form of the arrangement illustrated in FIGURE 36, the streams flowing in opposite directions being separated. In FIGURE 37, the higher energy air, from a source similar to that in FIGURE 25, is fed to the inboard curtain vortex by injector nozzle 145. The air is expelled from the inboard supply and outlet transfer port 146, the curtain flowing downwardly and inwardly towards the surface, curving round inwardly and upwardly, and entering inboard inlet transfer port 147 from where the air flows through inboard transfer duct 148 to the inboard supply and outlet transfer port 146. As air is being continuously supplied from the injector nozzle 145, there is a surplus of air over that required for the vortex. This air after being expelled from the port 146 flows down towards the surface curving round outwardly and upwardly towards the bottom surface of the vehicle. An outboard curtain vortex is fed with higher energy air by injector nozzle 150. The air is expelled from outboard supply and outlet transfer port 151, flowing downwardly and inwardly towards the surface, curving round inwardly and upwardly and entering an outboard inlet transfer port 149. The flow of the surplus air from the inboard curtain vortex forms a vortex 152 between ports 146 and 149. As more air is fed to the vortex 152 from the inboard curtain vortex, so excess air flows from the vortex 152 into the outboard inlet transfer port 149. As air is also continuously supplied from the injector nozzle 150, there is a further surplus of air over that required for the outboard curtain vortex, this surplus comprising the surplus air from the inboard curtain vortex which enters port 149 and the surplus due to the injector nozzle 150. This surplus air after being expelled from the outboard supply and outlet transfer port 151, flows down towards the surface, curving round outwardly and passing into the surrounding atmosphere at 153. This air represents the loss from the curtain system as is indicated by the arrow 111 in FIGURES 23 and 24.

FIGURE 38 illustrates a curtain system which is a modification of that shown in FIGURE 37 and is slightly more efficient. In this system the air added to each vortex is transferred from the relevant inlet transfer port to the relevant output transfer port by ducting separate from that which transfers the main vortex flow. For the inboard vortex system the higher energy air from injector nozzle 160 only energizes the air in the main vortex flow. After the curtain from supply and outlet transfer port 161 has reached the surface and curved upwards towards the bottom of the vehicle again, the main vortex flow enters the primary inlet transfer port 162, flowing through primary transfer duct 163 back to the supply and outlet transfer port 161. The surplus air generally equivalent to the air added from the injector nozzle 160, enters secondary inlet transfer port 164, flowing through secondary transfer duct 165 to a secondary outlet transfer port 166. A similar air flow pattern exists for the outboard vortex system, higher energy air from injector nozzle 170 energizing only the main vortex flow. In the outboard system, the surplus air from the inboard system flowing from the secondary outlet transfer port 166, joins with the surplus air from the outboard system flowing from outlet transfer port 171 equivalent to the air added from the injector nozzle 170. The two flows of surplus air enter secondary inlet transfer port 172 flowing through secondary transfer duct 173 to secondary outlet transfer port 174, from which the surplus air flows down towards the surface, curving outwardly and passing into the surrounding atmosphere. It will be seen that in this latter example it is only the main vortex flow which is energized in each vortex system, and there is thus a small saving in the requirements of higher energy air.

As explained above, where streams of fluid are immediately, adjacent, they should be travelling in the same direction, or if travelling in opposite directions then they should be spaced apart. Where in multiple curtain systems, a multiplicity of vortices are formed, if all the vortices rotate the same way then sufficient space must be left between adjacent vortices for the formation of a single smaller auxiliary vortex between each two main vortices, as shown in FIGURES 37 and 38, or any odd number of such auxiliary vortices. If for any reason it is not desired to space the main vortices apart to this extent, or this particular pattern of vortices is not required, adjacent vortices can be caused to rotate in opposite directions. When adjacent vortices rotate in opposite directions then they must be so spaced that either there is no space between them, one such system being illustrated in FIGURE 39 and used where it is desired to save space, or with sufficient space for an even number of auxiliary vortices to form. In FIGURE 39 the vortices are energized by higher energy air injected through injector nozzle 180. This nozzle is shown as being a single nozzle half of its width being in the transfer duct 181 of one vortex and the other half of its width in the transfer duct 182 of the other vortex. If preferred the nozzle 180 could be divided into two nozzles. The air of the inboard curtain after being expelled from the inboard supply and outlet transfer port 183 flows downward towards the surface, then curving round inwardly and upwardly into inboard inlet transfer port 184. The air then flows through the transfer duct 181 back to the port 183. The outboard curtain is expelled from the outboard and transfer supply port 185, flowing downward towards the surface and then curving round outwardly and upwardly into outboard inlet transfer port 186. The air then flows through the transfer duct 182 back to the port 185. Surplus air of the inboard vortex, equivalent to the air added by the injector nozzle 180, separates from the main vortex as air flows downwards towards the surface and curves outwardly into the outboard vortex. The surplus air of the outboard vortex, again equivalent to the air added by the nozzle 180, and the surplus air from the inboard vortex separates from the main flow of the outboard vortex as the main flow curves round upwardly from the surface to enter the outboard inlet transfer port 186, the surplus air passing into the surrounding atmosphere.

A further example of curtain configuration is illustrated in FIGURE 40 which shows a multiple curtain system with multiple vortices, only one of which is energized. This example is similar to that shown in FIGURE 38 with the outboard main vortex omitted. The air forming the inboard main vortex is expelled from inboard supply and outlet transfer port 195 being energised by higher energy air from injector nozzle 196. The air flows downward toward the surface, forming a curtain, the majority of the air curving round inwards and upwards towards the bottom of the vehicle where the main part of this flow enters inboard inlet transfer port 197. The aforesaid main part of the air flow which enters the inboard inlet transfer port 197 passes through transfer duct 198 back to the inboard supply and outlet transfer port 195. The remaining part of the air flow which curves back towards the bottom of the vehicle enters inboard subsidiary inlet port 199, passing through subsidiary transfer duct 200. The air in the subsidiary transfer duct 200 is expelled through outboard outlet transfer port 201. This port 201 is spaced from the inboard outlet transfer port 195 to an extent that an auxiliary vortex is also formed between this flow and the main vortex, as shown. Part of the air expelled from the outboard outlet transfer port 201 after flowing towards the surface, curves round inwardly and upwardly entering outboard inlet transfer port 202, passing through outboard transfer duct 203 to an outlet transfer port 204 where it passes into the surrounding atmosphere. Any small portion of the air flow from the port 195 which does not curve inwards, flows outwards and after passing through the aforesaid auxiliary vortex enters the outboard inlet transfer port 202 with the air from the outboard outlet transfer port 201, passing through the outboard transfer duct 203 and out of the outlet port 204 to the surrounding atmosphere.

Where more than one series of injector nozzles is used such as in FIGURES 37 and 38, the higher energy air supplied to the nozzles may come from the same high pressure source. Alternatively, each series of injector nozzles can be supplied from its own source which may be of the same or differing pressures. It is also possible to use a common air source to supply all the series of injector nozzles and to provide means for causing the air pressure to be different at the nozzle inlets to be different for each series of injector nozzles.

Variations in height will result in alteration in shape of the curtain, the upward flowing portion of the curtain or vortex tending to encounter the bottom of the vehicle at some point either slightly inboard or outboard of the inlet transfer port. FIGURES 41 and 42 illustrate means for overcoming this difficulty as applied to a vortex curtain system re-energised by an injector. The inlet transfer port 205 is made wide enough to allow for any movement, in or out, of the curtain, and vanes 206 are provided to increase the efficiency of the air re-entry. FIGURE 41 shows the flow pattern at normal height and FIGURE 42 the flow pattern at a height slightly above normal. The higher energy air is added through injector nozzles 207 from a compressor 208. As a further means of increasing the efficiency of the air reentry, the inboard edge of the inlet transfer port may be made higher than the outboard edge as shown at 210, the vanes 206 being arranged so that each succeeding inboard vane is slightly higher than the preceding outboard vane. Instead of the bottom of the vehicle between supply and outlet transfer port 209 and the inlet transfer port 205 being flat as in FIGURES 41 and 42, it may be curved in the form of a channel as shown in FIGURE 27. This will assist in the formation of an auxiliary vortex. The forming of such auxiliary vortices in such a manner may be arranged in most configurations of curtain systems, as a means for adding support to the curtains.

I claim:

1. A vehicle adapted to hover or travel over and out of contact with a surface at a predetermined height which is small in relation to the size of said vehicle comprising a body having an intake for fluid, means for drawing fluid through said intake and causing said fluid to issue from the lower part of said body and form a curtain of moving fluid travelling across the gap existing between said body and said surface, said curtain in combination with said body and said surface, effectively enclosing a gas-containing space between the bottom of said vehicle and said surface wherein a cushion of gas under pressure is formed, the horizontal cross-sectional area of said gas-containing space being a number of times larger than the cross-sectional area of said intake, and means for causing at least a part of the fluid forming said curtain to flow back into the body of said vehicle and then to re-issue from said body to supplement said curtain.

2. A vehicle adapted to hover or travel over and out of contact with a surface at a predetermined height which is small in relation to the size of said vehicle comprising a body having an intake for fluid, means for drawing fluid through said intake and causing said fluid to issue from the lower part of said body and form a first curtain of moving fluid travelling across the gap existing between said body and said surface, said curtain in combination with said body and said surface effectively enclosing a gas-containing space between the bottom of said vehicle and said surface wherein a cushion of gas under pressure is formed, the horizontal cross-sectional area of said gas-containing space being a number of times larger than the cross-sectional area of said intake, and means for causing at least a part of the fluid forming said first curtain to form at least part of a second curtain positioned outboard of the said first curtain.

3. A vehicle as claimed in claim 2 wherein the curtain-forming means are so constructed and arranged that the fluid forming said second curtain issues from said body at a lower pressure than that forming said first curtain.

4. A vehicle adapted to hover or travel over and out of contact with a surface at a predetermined height which is small in relation to the size of said vehicle comprising a body having an intake for fluid, means for drawing fluid through said intake and causing said fluid to issue from the lower part of said body and form a first curtain of moving fluid travelling across the gap existing between said body and said surface, said curtain in combination with said body and said surface effectively enclosing a gas-containing space between the bottom of said vehicle and said surface wherein a cushion of gas under pressure is formed, said means including a supply port from which said fluid issues to form said first curtain, an outlet transfer port outboard of said supply port from which at least a part of the fluid forming said first curtain re-issues to form at least part of a second curtain, an inlet transfer port through which fluid from said first curtain may flow back into the body of said vehicle, and a transfer duct connecting said inlet and outlet transfer ports.

5. A vehicle as claimed in claim 4 including a second supply port outboard of said first supply port and adjacent said outlet transfer port to which fluid is supplied independently of said first supply port, said second supply port being so positioned and arranged with resect to said outlet transfer port as to cause the fluid issuing from said second supply port to form part of said second curtain.

6. A vehicle as claimed in claim 4 wherein the defined arrangement of ports and duct is repeated so as to effect a multi-stage utilisation of said fluid.

7. A vehicle as claimed in claim 6 wherein the curtain-forming means are so constructed and arranged that the fluid forming each curtain issues at a lower pressure than that forming the curtain inboard of the aforesaid curtain.

8. A vehicle as claimed in claim 4 including means in said transfer duct for increasing the pressure of the fluid flowing therethrough.

9. A vehicle adapted to hover or travel over and out of contact with a surface at a predetermined height which is small in relation to the size of said vehicle comprising a body having an intake for fluid, means for drawing fluid through said intake and causing said fluid to issue from the lower part of said body and form a curtain of moving fluid travelling across the gap existing between said body and said surface, said curtain in combination with said body and said surface effectively enclosing a gas-containing space between the bottom of said vehicle and said surface wherein a cushion of gas under pressure is formed, the horizontal cross-sectional area of said gas-containing space being a number of times larger than the cross-sectional area of said intake, and means for causing at least a part of the fluid forming said curtain to re-circulate in said curtain.

10. A vehicle as claimed in claim 9 wherein said curtain-forming means comprises a supply and outlet transfer port through which said fluid issues to form said curtain, an inlet tarnsfer port into which at least a part of the fluid forming said curtain is drawn back into said body, a transfer duct connecting said inlet transfer port to said supply and outlet transfer port, and means for supplying energy to said fluid to cause it to circulate round the circuit formed by said ports and said transfer duct.

11. A vehicle as claimed in claim 10 wherein said means for supplying energy to said fluid comprises a source of fluid of higher energy than the curtain-forming fluid, and injector means for adding said higher energy fluid to the curtain-forming fluid.

12. A vehicle as claimed in claim 10, wherein said supply port and said transfer port are positioned in the bottom of said vehicle body and are separated by a portion of said bottom which is concave in cross section, whereby the curtain is produced in the form of a vortex, a portion of said vortex being accommodated by said concave portion of said bottom.

13. A vehicle as claimed in claim 10 wherein said energy supplying means comprises a blower in said transfer duct, and which includes means for maintaining the intake of said blower at a pressure at least equal to the pressure immediately outboard of the curtain.

14. A vehicle as claimed in claim 13 including auxiliary means for increasing the intake pressure of said blower above the pressure immediately outboard of the curtain.

15. A vehicle as claimed in claim 10 wherein the defined arrangement of ports, transfer duct and energising means is repeated so as to produce a plurality of curtains.

16. A vehicle as claimed in claim 10 including a series of parallel vanes located in and spaced apart across the width of said inlet transfer port, a source of fluid of higher energy than the curtain-forming fluid, and injector means for adding said higher energy fluid to said curtain-forming fluid and causing the same to recirculate in the form of a vortex curtain.

17. A vehicle as claimed in claim 10, wherein the inboard edge of said inlet transfer port is further from the periphery of the vehicle body and higher than the outboard edge thereof, a source of fluid of higher energy than the curtain-forming fluid, and injector means for adding said higher energy fluid to said curtain-forming fluid and causing the same to recirculate in the form of a vortex curtain.

18. A vehicle adapted to hover or travel over and out of contact with a surface at a predetermined height which is small in relation to the size of said vehicle comprising a body, means for causing a fluid to issue from the lower part of said body and form at least one curtain of moving fluid travelling across the gap existing between said body and said surface, said curtain in combination with said body and said surface effectively enclosing a gas-containing space between the bottom of the vehicle and the surface wherein a cushion of gas under pressure is formed, means operatively associated with said first-named means for drawing at least part of the fluid forming said curtain back into the body of the vehicle and then causing the same to supplement and recirculate with the fluid which is caused to issue from the lower part of said body by said first-named means, a source of fluid carried by said body of higher energy than the fluid which is caused to issue from the lower part of said body by said first-named means, and injector means operatively associated with said second-named means for causing said higher energy fluid to mix with the recirculating fluid and re-energise the latter by injector action.

19. A vehicle adapted to hover or travel over and out of contact with a surface at a predetermined height which is small in relation to the size of said vehicle comprising a body having a supply and outlet transfer port in the lower part thereof, means for causing a fluid to issue from said port and form a curtain of moving fluid travelling across the gap existing between said body and said surface, said curtain in combination with said body and said surface effectively enclosing a gas-containing space between the bottom of the vehicle and the surface wherein a cushion of gas under pressure is formed, means including an inlet transfer port and a transfer duct connecting said inlet transfer port to said supply and outlet transfer port for drawing at least part of the fluid forming said curtain back into the body of the vehicle and then causing the same to re-issue from said body and re-circulate in said curtain, a source of fluid of higher energy than the curtain-forming fluid, and injector means for adding said higher energy fluid to said curtain-forming fluid and causing the same to recirculate in the form of a vortex curtain.

20. A vehicle adapted to hover or travel over and out of contact with a surface at a predetermined height which is small in relation to the size of said vehicle comprising a body having a supply and outlet transfer port positioned in the bottom thereof, means for causing a fluid to issue from said port and form a curtain of moving fluid travelling across the gap existing between said body and said surface, said curtain in combination with said body and said surface effectively enclosing a gas-containing space between the bottom of said body and the surface wherein a cushion of gas under pressure is formed, means including an inlet transfer port positioned in the bottom of said body inboard of said supply and outlet transfer port and a transfer duct connecting said inlet transfer port to said supply and outlet transfer port for drawing at least part of the fluid forming said curtain back into the body of the vehicle and then causing the same to re-issue from said body and recirculate in said curtain, a source of fluid of higher energy than the curtain-forming fluid, and injector means for injecting said higher energy fluid into said transfer duct so as to cause the curtain-forming fluid to recirculate in the form of a vortex curtain.

21. A vehicle as claimed in claim 20 wherein the injector means injects said higher energy fluid into said transfer duct at a point adjacent to said supply and outlet transfer port.

22. A vehicle adapted to hover or travel over and out of contact with a surface at a predetermined height which is small in relation to the size of said vehicle comprising a body, means including a supply port in the lower part of said body for causing a fluid to issue from said body and form a first curtain of moving fluid travelling across the gap existing between said body and said surface, said curtain in combination with said body and said surface effectively enclosing a gas-containing space between the bottom of the vehicle and the surface wherein a cushion of gas under pressure is formed, means operatively associated with said first-named means for drawing at least part of the fluid forming said first curtain back into the body of the vehicle and then causing the same to supplement and recirculate with the fluid which is caused to issue from said supply port, a source of fluid carried by said body of higher energy than the fluid which is caused to issue from said supply port, injector means operatively associated with said second-named means for causing said higher energy fluid to mix with the recirculating fluid and re-energise the latter by injector action, and means including an outlet transfer port outboard of said supply port, an inlet transfer port adjacent said supply port and a transfer duct connecting said inlet and outlet transfer ports for drawing at least part of the fluid forming said first curtain back into the body of the vehicle and then causing the same to re-issue from said body to form at least a part of a second curtain of moving fluid travelling across the gap existing between said body and said surface.

23. A vehicle as claimed in claim 22 wherein the defined arrangement of ports and duct is repeated so as to effect a multi-stage utilisation of said fluid.

24. A vehicle adapted to hover or travel over and out of contact with a surface at a predetermined height which is small in relation to the size of said vehicle comprising a body having a first supply and outlet transfer port in the lower part thereof, means for causing a fluid to issue from said port and form a first curtain of moving fluid travelling across the gap existing between said body and said surface, said curtain in combination with said body and said surface effectively enclosing a gas-containing space between the bottom of the vehicle and the surface wherein a cushion of gas under pressure is formed, means including a first inlet transfer port and first transfer duct connecting said first inlet transfer port to said first supply and outlet transfer port for drawing at least part of the fluid forming said first curtain back into the body of the vehicle and then causing the same to reissue from said body and recirculate in said curtain, a source of fluid of higher energy than the fluid forming said first curtain, a first injector means for adding said higher energy fluid to said fluid forming said first curtain and causing the same to recirculate in the form of a vortex curtain, and means including a second supply and outlet transfer port, a second inlet transfer port, a second transfer duct and a second injector means for producing a second vortex curtain outboard of said first curtain.

25. A vehicle adapted to hover or travel over and out of contact with a surface at a predetermined height which is small in relation to the size of said vehicle comprising a body having a first port in the lower part thereof, means for causing fluid to issue from said first port in the form of a first jet which travels across the gap existing between said body and said surface, a second port in the lower part of said body outboard of said first port, and means for causing at least a part of the fluid forming said first jet to flow back into the body of said vehicle and then to re-issue from said second port in the form of a second jet, the fluid forming said jets, including that which flows back into the body of the vehicle, constituting two curtains of moving fluid which, in combination with said body and said surface, effectively enclose a gas-containing space between the bottom of said vehicle and said surface wherein a cushion of gas under pressure is formed.

26. A vehicle adapted to hover or travel over and out of contact with a surface at a predetermined height which is small in relation to the size of said vehicle comprising a body having a first port in the lower part thereof, means for causing fluid to issue from said first port in the form of a first jet which travels across the gap existing between said body and said surface, a second port in the lower part of said body outboard of said first port, and means for causing fluid to issue from said second port in the form of a second jet, said last-named means including an inlet transfer port between said first and second ports through which at least a part of the fluid forming said first jet may flow back into the body of said vehicle, and a transfer duct connecting said inlet transfer port to said second port, the fluid forming said jets, including that which flows back into the body of the vehicle through said inlet transfer port, constituting two curtains of moving fluid which, in combination with said body and said surface, effectively enclose a gas-containing space between the bottom of said vehicle and said surface wherein a cushion of gas under pressure is formed.

27. A vehicle as claimed in claim 26 including a third port outboard of said first port to which fluid is supplied independently of said first port, said third port being so positioned and arranged with respect to said second port as to cause the fluid issuing from said third port to form part of said second jet.

28. A vehicle adapted to hover or travel over and out of contact with a surface at a predetermined height which is small in relation to the size of said vehicle comprising a body having a first port in the lower part thereof, means for causing fluid to issue from said first port in the form of a first jet which travels across the gap existing between said body and said surface, a second port in the lower part of said body outboard of said first port, means for causing fluid to issue from said second port in the form of a second jet which also travels across the gap existing between said body and said surface, an inlet transfer port between said first and second ports, an outlet transfer port adjacent said second port, and means for causing at least a part of the fluid forming said first jet to flow back into the body of said vehicle through said inlet transfer port and then to re-issue from said outlet transfer port, and said outlet transfer port being so positioned and arranged with respect to said second port as to cause the fluid issuing from said outlet transfer port to form part of said second jet, the fluid forming said jets, including that which flows back into the body of the vehicle, constituting two curtains of moving fluid which, in combination with said body and said surface, effectively enclose a gas-containing space between the bottom of said vehicle and said surface wherein a cushion of gas under pressure is formed.

29. A vehicle adapted to hover or travel over and out of contact with a surface at a predetermined height which is small in relation to the size of said vehicle comprising a body having a first port in the lower part thereof, means for causing fluid to issue from said first port in the form of a first jet which travels across the gap existing between said body and said surface, a second port in the lower part of said body outboard of said first port, and means for causing fluid to issue from said second port in the form of a second jet, said last named means including an inlet transfer port inboard of said first port through which at least part of the fluid forming said first jet may flow back into the body of said vehicle, and a transfer duct connecting said inlet transfer port to said second port, the fluid forming said jets, including that which flows back into the body of the vehicle through said inlet transfer port, constituting two curtains of moving fluid which, in combination with said body and said surface, effectively enclose a gas-containing space between the bottom of said vehicle and said surface wherein a cushion of gas under pressure is formed.

30. A vehicle adapted to hover or travel over and out of contact with a surface at a predetermined height which is small in relation to the size of said vehicle comprising a body having a supply port in the lower part thereof, means for causing fluid to issue from said port in the form of a jet which travels across the gap existing between said body and said surface, and means for causing at least a part of the fluid forming said jet to flow back into the body of said vehicle and then to reissue from said body to supplement said jet, the fluid forming said jet and that which flows back into the body of the vehicle and then reissues therefrom constituting at least one curtain of moving fluid which, in combination with said body and said surface, effectively encloses a gas-containing space between the bottom of said vehicle and said surface wherein a cushion of gas under pressure is formed, the horizontal cross-sectional area of said gas-containing space being a number of times larger than the cross-sectional area of said supply port.

31. A vehicle adapted to hover or travel over and out of contact with a surface at a predetermined height which is small in relation to the size of said vehicle comprising a body having a supply port in the lower part thereof, means for causing fluid to issue from said port in the form of a jet which travels across the gap existing between said body and said surface, and means for causing at least a part of the fluid forming said jet to flow back into the body of said vehicle and then to re-issue from said port as part of said jet, the fluid forming said jet, including that which flows back into the body of the vehicle, constituting a curtain of moving fluid in the form of a vortex which, in combination with said body and said surface, effectively encloses a gas-containing space between the bottom of said vehicle and said surface wherein a cushion of gas under pressure is formed, the horizontal cross-sectional area of said gas-containing space being a number of times larger than the cross-sectional area of said supply port.

32. A vehicle adapted to hover or travel over and out of contact with a surface at a predetermined height which is small in relation to the size of said vehicle comprising a body having a supply and outlet transfer port in the lower part thereof, means for causing fluid to issue from said port in the form of a jet which travels across the gap existing between said body and said surface, an inlet transfer port through which at least a part of the fluid forming said jet may flow back into said body, a transfer duct connecting said transfer port to said supply and outlet transfer port whereby that part of the fluid which flows back into said body is caused to reissue from said supply and outlet transfer port as part of said jet, and means for supplying energy to said fluid to cause it to circulate round the circuit formed by said ports and said transfer duct, the fluid forming said jet, including that which flows back into the body of the vehicle, constituting a curtain of moving fluid in the form of a vortex which, in combination with said body and said surface, effectively encloses a gas-containing space between the bottom of said vehicle and said surface wherein a cushion of gas under pressure is formed, the horizontal cross-sectional area of said gas-containing space being a number of times larger than the cross-sectional area of said supply port.

33. A vehicle adapted to hover or travel over and out of contact with a surface at a predetermined height which is small in relation to the size of said vehicle comprising a body, means including a first supply port in the lower part of said body for causing a fluid to issue from said body and form a first curtain of moving fluid travelling across the gap existing between said body and said surface, said curtain in combination with said body and said surface effectively enclosing a gas-containing space between the bottom of the vehicle and the surface wherein a cushion of gas under pressure is formed, means operatively associated with said first named means for causing at least part of the fluid forming said first curtain to flow back into the body of the vehicle and then supplement and recirculate with the fluid which is caused to issue from said first supply port, a source of fluid carried by said body of higher energy than the fluid which is caused to issue from said first supply port, injector means operatively associated with said second named means for causing said higher energy fluid to mix with the recirculating fluid and re-energise the latter by injector action, means including an outlet transfer port outboard of said first supply port, an inlet transfer port adjacent said first supply port and a transfer duct connecting said inlet and outlet transfer ports for causing at least part of the fluid forming said first curtain to flow back into the body of the vehicle and then reissue from said body to form at least part of a second curtain of moving fluid travelling across the gap existing between said body and said surface, and a second supply port outboard of said first supply port and adjacent said outlet transfer port to which fluid is supplied independently of said first supply port and from which fluid issues to form part of said second curtain.

34. A ground effect vehicle comprising: a body having a substantially airtight undersurface; means mounted to said body for emitting therefrom and therebeneath at a location inwardly of the periphery of said body a downwardly and inwardly-directed jet-like curtain of air extending along at least the front and rear peripheral extents of said undersurface with a velocity and volumetric flow rate sufficient to create between said undersurface and the earth a cushion of air under superatmospheric pressure sufficient to raise said body to a stable elevation above the earth; duct means in said body having an outlet directly communicating with said emitting means for supplying air to said emitting means, said duct means having an elongated intake opening located adjacent the periphery of said body and outwardly of and generally parallel to the base of said curtain for sucking back into said body at least a major portion of the air which is flowing outwardly from the cushion from between said body and the earth; and means normally closing said duct means to the entrance of ambient air between said outlet and said intake opening.

35. The method of supporting a vehicle having a substantially air-tight undersurface, above and in close proximity to the earth while propelling the vehicle horizontally, the steps comprising: creating between the vehicle undersurface and the earth a cushion of air under superatmospheric pressure sufficient to lift the vehicle to a stable elevation above the earth by emitting from and beneath the vehicle at a location inwardly of the periphery of the vehicle air under pressure in the form of a downwardly and inwardly-directed jet-like curtain extending along at least the front and rear peripheral extents of the undersurface; sucking back into the vehicle, at a location outwardly of the curtain, at least a major portion of the air flowing outwardly from the cushion at least at the front and rear of the vehicle; and re-emitting the sucked-in air at the first-mentioned location, in the form of the curtain, and at substantially the same rate that the air is sucked back in in order to continue to maintain the cushion.

36. In an air suspension vehicle having means to provide a flow of air from an upper portion thereof through the vehicle to its lower side above the surface over which it is to be suspended, a dynamic seal to reduce the leakage rate of air from between said surface and the underside of said vehicle to the periphery thereof, said seal comprising: means substantially coextensive with the underside periphery of said vehicle for forming alternate, opposite rotating vortexes in air moving outwardly from the underside of said vehicle, said means having downwardly facing concave surfaces.

37. In an air suspension vehicle having means to provide a flow of air from an upper portion thereof through the vehicle to its lower side above the surface over which it is to be suspended, a dynamic seal to reduce the leakage rate of air from between said surface and the underside of said vehicle to the periphery thereof, said seal comprising: means on the underside of said vehicle substantially coextensive with and adjacent its periphery for forming alternate, oppositely rotating vortexes in air adjacent said periphery and moving outwardly from said underside of said vehicle, said means adapted to guide said vortexes outwardly from the underside of said vehicle.

38. In an air suspension vehicle having means to provide a flow of air from an upper portion thereof through the vehicle to its lower side above the surface over which it is to be suspended, a dynamic seal to reduce the leakage rate of air from between said surface and the underside of said vehicle to the periphery thereof, said seal comprising: means including upwardly extending re-entrant portions having downwardly facing concave surfaces and being on the underside of said vehicle adjacent and substantially coextensive with its periphery for forming alternate, oppositely rotating vortexes in air moving outwardly from said underside of said vehicle.

References Cited

UNITED STATES PATENTS

| | | | |
|---|---|---|---|
| 3,065,935 | 11/1962 | Dubbury et al. | 180—120 X |
| 3,156,314 | 11/1964 | Riddle | 180—130 |
| 3,275,090 | 9/1966 | Weiland | 180—130 |
| 3,342,280 | 9/1967 | Beardsley | 180—129 |
| 3,363,716 | 1/1968 | Cockerell | 180—129 |
| 2,838,257 | 6/1958 | Wibault. | |
| 2,922,277 | 1/1960 | Bertin. | |
| 3,117,644 | 1/1964 | Cockerell | 180—7 |
| 3,117,645 | 1/1964 | Cockerell | 180—7 |
| 3,118,513 | 1/1964 | Cockerell | 180—7 |
| 3,156,314 | 11/1964 | Riddle | 180—7 |
| 3,165,159 | 1/1965 | Egginton et al. | 180—7 |
| 3,168,155 | 2/1965 | Cockerell | 180—7 |

OTHER REFERENCES

Publication: "Remarks on the Ground Effect Machine," by G. D. Doshler; Sept. 25–26, 1958; Fig. 17 relied on.

A. HARRY LEVY, *Primary Examiner.*